(12) United States Patent
Hammond, Jr.

(10) Patent No.: US 9,711,906 B2
(45) Date of Patent: *Jul. 18, 2017

(54) METHODS AND SYSTEMS FOR COMPENSATING FOR ALIEN CROSSTALK BETWEEN CONNECTORS

(71) Applicant: CommScope Technologies LLC, Hickory, NC (US)

(72) Inventor: Bernard Harold Hammond, Jr., Cheltenham (GB)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,922

(22) Filed: Sep. 18, 2015

(65) Prior Publication Data
US 2016/0111823 A1 Apr. 21, 2016

Related U.S. Application Data

(63) Continuation of application No. 13/758,338, filed on Feb. 4, 2013, now Pat. No. 9,153,913, which is a
(Continued)

(51) Int. Cl.
*H01R 13/6466* (2011.01)
*H04B 3/32* (2006.01)
(Continued)

(52) U.S. Cl.
CPC ..... *H01R 13/6466* (2013.01); *H01R 13/6581* (2013.01); *H01R 13/6633* (2013.01);
(Continued)

(58) Field of Classification Search
USPC ........ 379/55.1, 86, 332, 340, 400, 417, 438, 379/443; 439/404, 620.01, 620.24, 676,
(Continued)

(56) References Cited

U.S. PATENT DOCUMENTS

| 4,831,497 A | 5/1989 | Webster et al. |
| 4,850,887 A | 7/1989 | Sugawara |

(Continued)

FOREIGN PATENT DOCUMENTS

| EP | 0 602 484 A2 | 6/1994 |
| EP | 0 901 198 | 3/1999 |

(Continued)

OTHER PUBLICATIONS

Database IEEE 802 Standars 'Online! IEEE; IEEE802.3 Interim Jan. 2003; 10GBASE-T Jan. 2003 (Jan. 2003), Larry Cohen: "Alien Crosstalk Measurement" XP002334395; retrieved from www.ieee802.org/3/10gbt/public/jan03/cohen;_1_0103.PDF; the whole document.

(Continued)

*Primary Examiner* — Yosef K Laekemariam
(74) *Attorney, Agent, or Firm* — Merchant & Gould P.C.

(57) ABSTRACT

The present invention relates to methods and systems for minimizing alien crosstalk between connectors. Specifically, the methods and systems relate to isolation and compensation techniques for minimizing alien crosstalk between connectors for use with high-speed data cabling. A frame can be configured to receive a number of connectors. Shield structures may be positioned to isolate at least a subset of the connectors from one another. The connectors can be positioned to move at least a subset of the connectors away from alignment with a common plane. A signal compensator may be configured to adjust a data signal to compensate for alien crosstalk. The connectors are configured to efficiently and accurately propagate high-speed data signals by, among other functions, minimizing alien crosstalk.

12 Claims, 31 Drawing Sheets

Related U.S. Application Data continuation of application No. 12/336,373, filed on Dec. 16, 2008, now Pat. No. 8,369,513, which is a continuation of application No. 11/058,902, filed on Feb. 15, 2005, now abandoned, which is a continuation-in-part of application No. 10/783,853, filed on Feb. 20, 2004, now Pat. No. 7,187,766.

(51) Int. Cl.

| | |
|---|---|
| *H01R 13/66* | (2006.01) |
| *H01R 13/719* | (2011.01) |
| *H04B 3/487* | (2015.01) |
| *H01R 13/6581* | (2011.01) |
| *H01R 24/64* | (2011.01) |

(52) U.S. Cl.
CPC ....... *H01R 13/6658* (2013.01); *H01R 13/719* (2013.01); *H01R 24/64* (2013.01); *H04B 3/32* (2013.01); *H04B 3/487* (2015.01)

(58) Field of Classification Search
USPC .......................................................... 439/941
See application file for complete search history.

(56) References Cited

U.S. PATENT DOCUMENTS

| | | |
|---|---|---|
| 5,129,842 A | 7/1992 | Morgan et al. |
| 5,207,583 A | 5/1993 | DeBalko et al. |
| 5,350,324 A | 9/1994 | Guilbert |
| 5,580,270 A | 12/1996 | Pantland et al. |
| 5,639,267 A | 6/1997 | Loudermilk |
| 5,700,167 A * | 12/1997 | Pharney ............... H05K 1/0228 439/676 |
| 5,716,237 A | 2/1998 | Conorich et al. |
| 5,861,783 A | 1/1999 | Savicki |
| 5,864,089 A | 1/1999 | Rainal |
| 5,887,032 A | 3/1999 | Cioffi |
| 5,915,989 A | 6/1999 | Adriaenssens et al. |
| 5,921,818 A | 7/1999 | Larsen et al. |
| 5,932,051 A | 8/1999 | Mueller et al. |
| 5,961,354 A | 10/1999 | Hashim |
| 5,967,853 A | 10/1999 | Hashim |
| 5,971,813 A | 10/1999 | Kunz et al. |
| 5,989,071 A | 11/1999 | Larsen et al. |
| 5,997,358 A | 12/1999 | Adriaenssens et al. |
| 6,036,547 A | 3/2000 | Belopolsky et al. |
| 6,042,427 A | 3/2000 | Adriaenssens et al. |
| 6,050,843 A | 4/2000 | Adriaenssens et al. |
| 6,052,038 A | 4/2000 | Savicki |
| 6,058,256 A | 5/2000 | Mellen et al. |
| 6,060,665 A | 5/2000 | Daoud |
| 6,086,428 A | 7/2000 | Pharney et al. |
| 6,107,578 A | 8/2000 | Hashim |
| 6,116,964 A | 9/2000 | Goodrich et al. |
| 6,116,965 A | 9/2000 | Arnett et al. |
| 6,139,371 A | 10/2000 | Troutman et al. |
| 6,155,881 A | 12/2000 | Arnett et al. |
| 6,165,018 A | 12/2000 | Arnett et al. |
| 6,165,023 A | 12/2000 | Troutman et al. |
| 6,168,474 B1 | 1/2001 | German et al. |
| 6,176,742 B1 | 1/2001 | Arnett et al. |
| 6,186,834 B1 | 2/2001 | Arnett et al. |
| 6,196,880 B1 | 3/2001 | Goodrich et al. |
| 6,224,427 B1 | 5/2001 | Goodrich |
| 6,234,832 B1 | 5/2001 | Belopolsky et al. |
| 6,238,231 B1 | 5/2001 | Chapman et al. |
| 6,270,381 B1 | 8/2001 | Adriaenssens et al. |
| 6,276,954 B1 | 8/2001 | Arnett et al. |
| 6,280,232 B1 | 8/2001 | Beecher et al. |
| 6,290,546 B1 | 9/2001 | Pharney |
| 6,325,634 B1 | 12/2001 | Daoud et al. |
| 6,350,158 B1 | 2/2002 | Arnett et al. |
| 6,366,671 B1 | 4/2002 | Beavers |
| 6,402,560 B1 | 6/2002 | Lin |
| 6,419,526 B1 | 7/2002 | Fair et al. |
| 6,428,362 B1 | 8/2002 | Phommachanh |
| 6,441,318 B1 | 8/2002 | Kiersh et al. |
| 6,443,777 B1 | 9/2002 | McCurdy et al. |
| 6,464,541 B1 | 10/2002 | Hashim et al. |
| 6,530,810 B2 | 3/2003 | Goodrich et al. |
| 6,537,106 B1 | 3/2003 | Follingstad |
| 6,547,604 B2 | 4/2003 | Arnett et al. |
| 6,592,395 B2 | 7/2003 | Brown et al. |
| 6,663,436 B1 | 12/2003 | Arnett et al. |
| 6,736,681 B2 | 5/2004 | Arnett |
| 6,802,743 B2 | 10/2004 | Aekins et al. |
| 6,816,025 B2 | 11/2004 | Nguyen |
| 6,821,142 B1 | 11/2004 | Rayev et al. |
| 6,840,816 B2 | 1/2005 | Aekins |
| 6,866,548 B2 | 3/2005 | Hashim |
| 6,875,928 B1 | 4/2005 | Hayes et al. |
| 6,891,731 B1 | 5/2005 | Herrell |
| 6,893,296 B2 | 5/2005 | Aekins et al. |
| 6,896,557 B2 | 5/2005 | Aekins et al. |
| 6,923,673 B2 | 8/2005 | Doorhy et al. |
| 6,964,587 B2 | 11/2005 | Colantuono et al. |
| 6,982,560 B2 | 1/2006 | Pandya et al. |
| 6,994,594 B2 | 2/2006 | Milner et al. |
| 7,115,815 B2 | 10/2006 | Kenny et al. |
| 7,187,766 B2 | 3/2007 | Hammond, Jr. |
| 7,214,884 B2 | 5/2007 | Kenny et al. |
| 8,369,513 B2 | 2/2013 | Hammond, Jr. |
| 2001/0021608 A1* | 9/2001 | Borbolla ............ H01R 13/6477 439/676 |
| 2002/0160662 A1 | 10/2002 | Arnett et al. |
| 2003/129877 A1 | 7/2003 | Chen |
| 2003/0157842 A1 | 8/2003 | Arnett et al. |
| 2004/0067693 A1* | 4/2004 | Arnett ................. H05K 1/0228 439/676 |
| 2004/0184247 A1 | 9/2004 | Adriaenssens et al. |
| 2005/0095919 A1 | 5/2005 | Aekins et al. |
| 2005/0095920 A1 | 5/2005 | Aekins et al. |
| 2005/0106946 A1 | 5/2005 | Doorhy et al. |
| 2005/0118881 A1 | 6/2005 | Aekins et al. |
| 2005/0136729 A1 | 6/2005 | Redfield et al. |
| 2005/0221678 A1 | 10/2005 | Hammond, Jr. |
| 2005/0245125 A1 | 11/2005 | Colantuono et al. |
| 2005/0250372 A1 | 11/2005 | Doorhy et al. |
| 2006/0019549 A1 | 1/2006 | Ciezak et al. |
| 2013/0210278 A1 | 8/2013 | Hammond, Jr. |

FOREIGN PATENT DOCUMENTS

| | | |
|---|---|---|
| WO | WO 96/02962 A1 | 2/1996 |
| WO | WO 01/82418 A1 | 11/2001 |
| WO | WO 2005/083900 | 9/2005 |

OTHER PUBLICATIONS

Molex Premise Networks, White Paper, High Frequency Compensation Techniques, pp. 1-5, http://molexpn.com.

\* cited by examiner

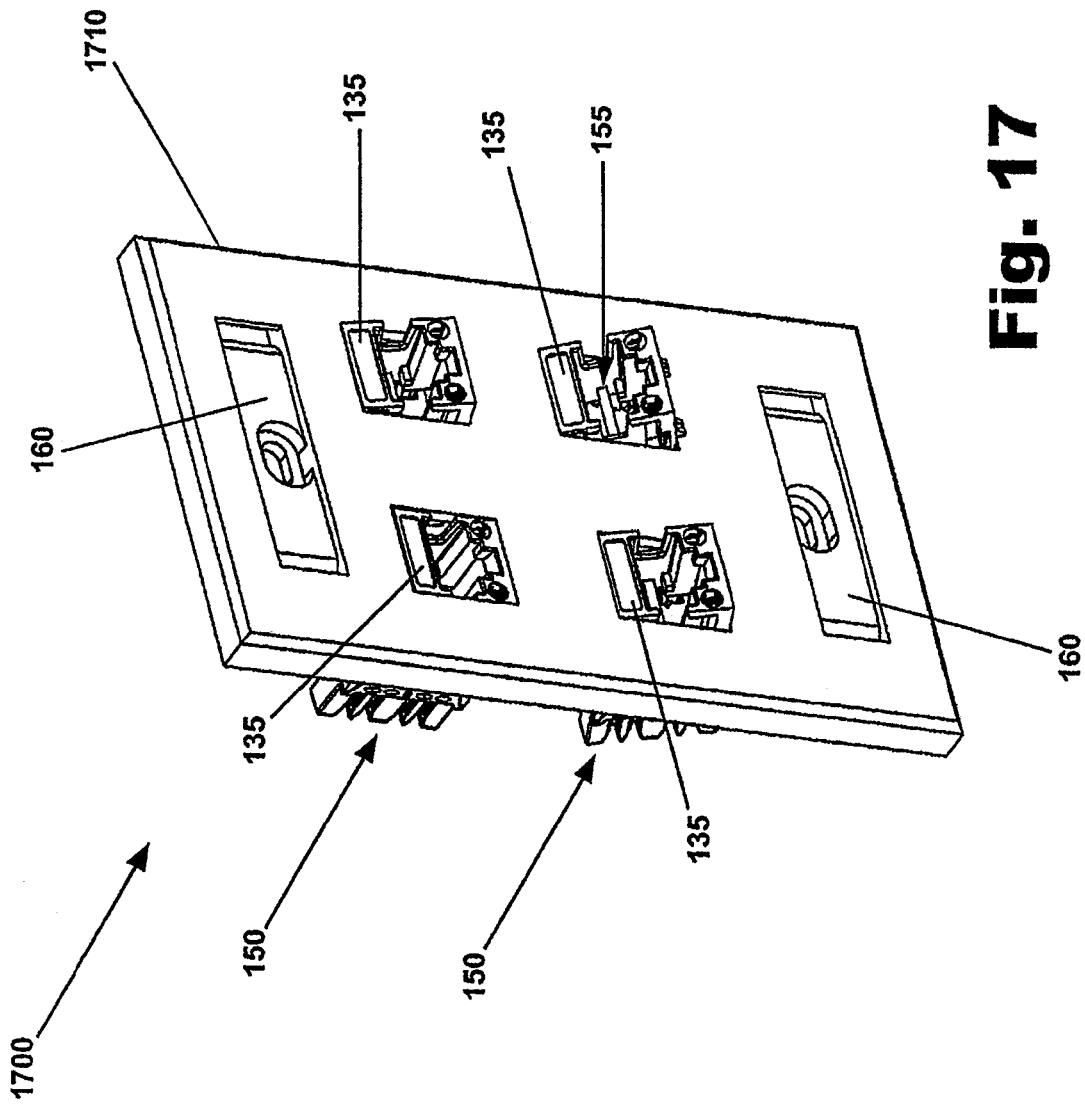

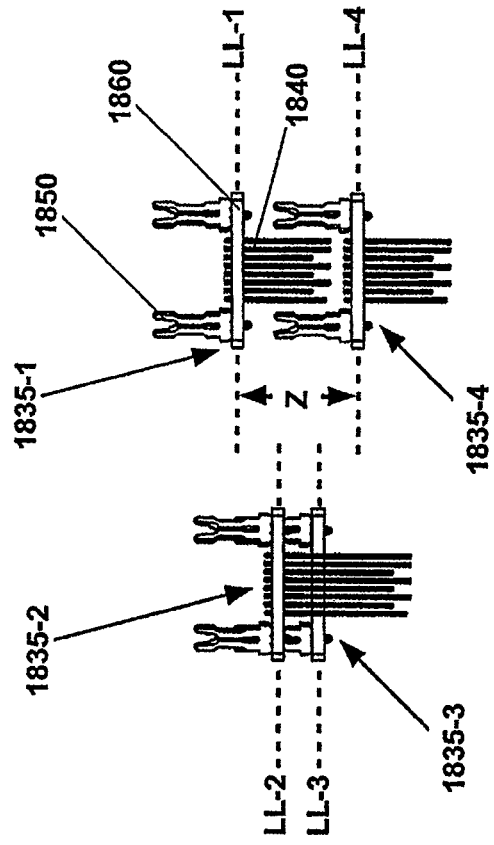
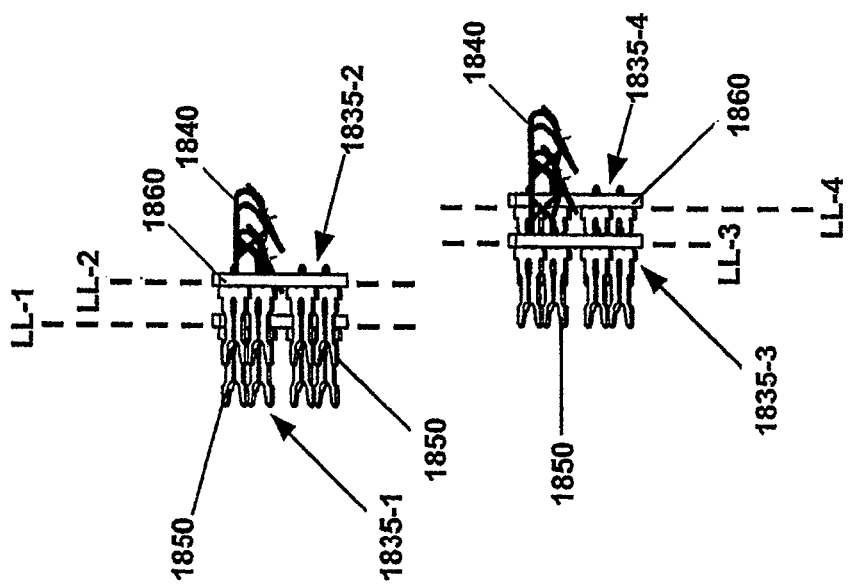
Fig. 18C
Fig. 18B

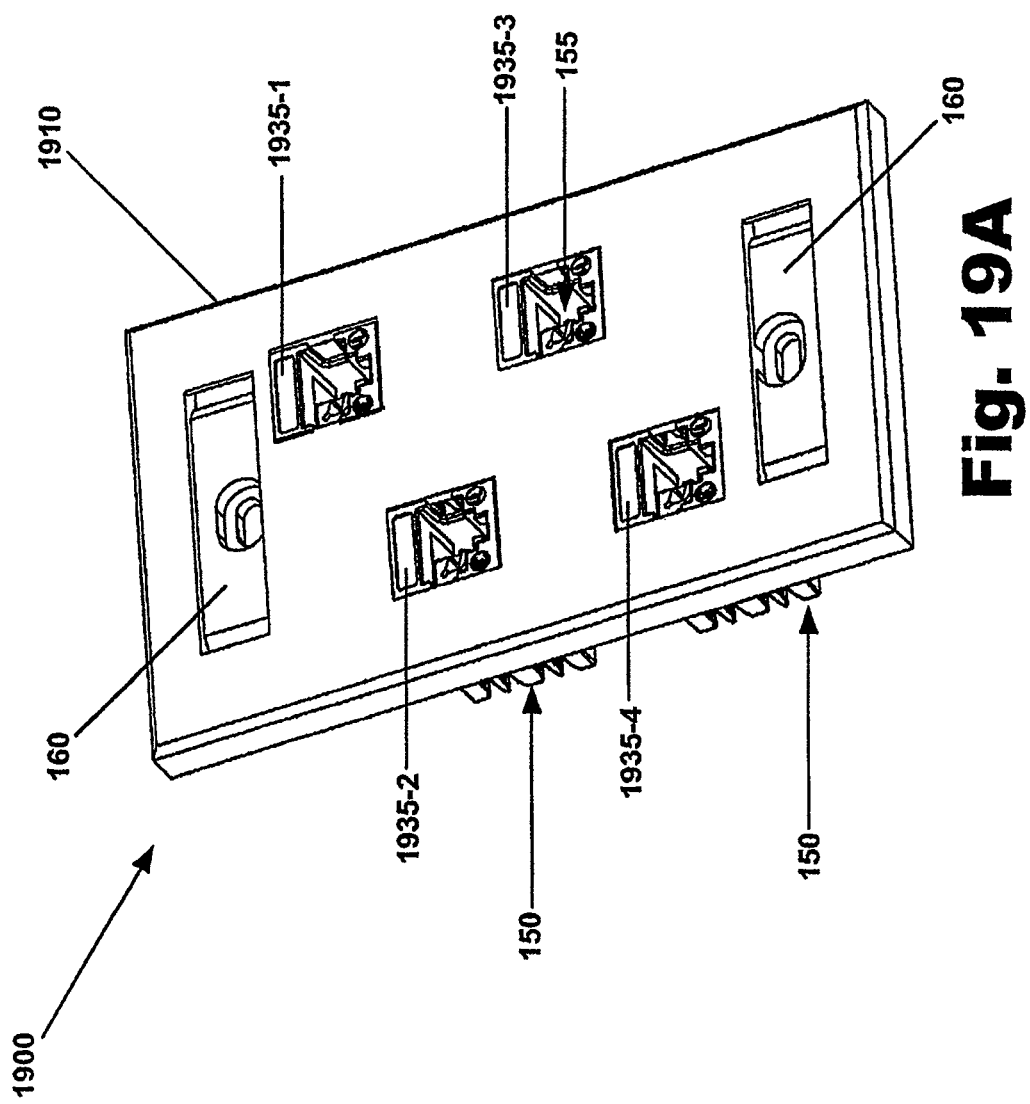

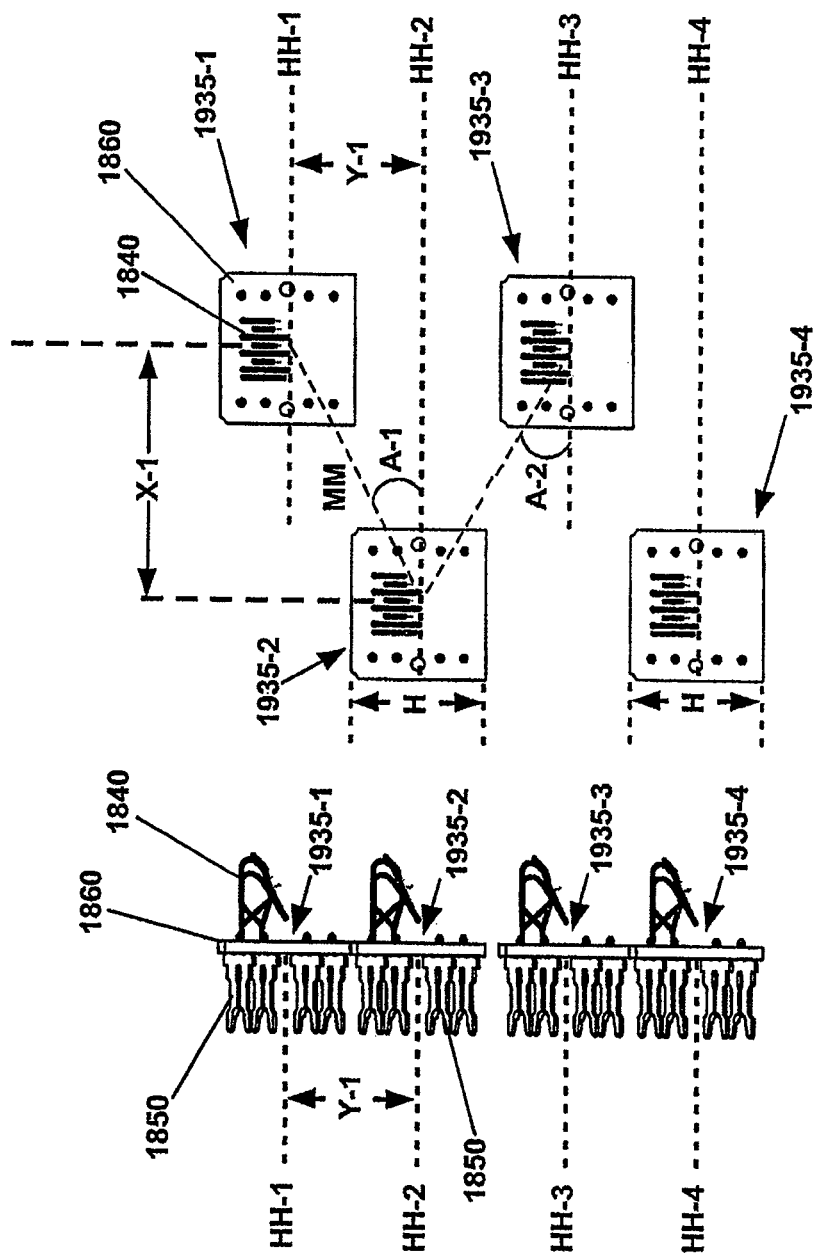

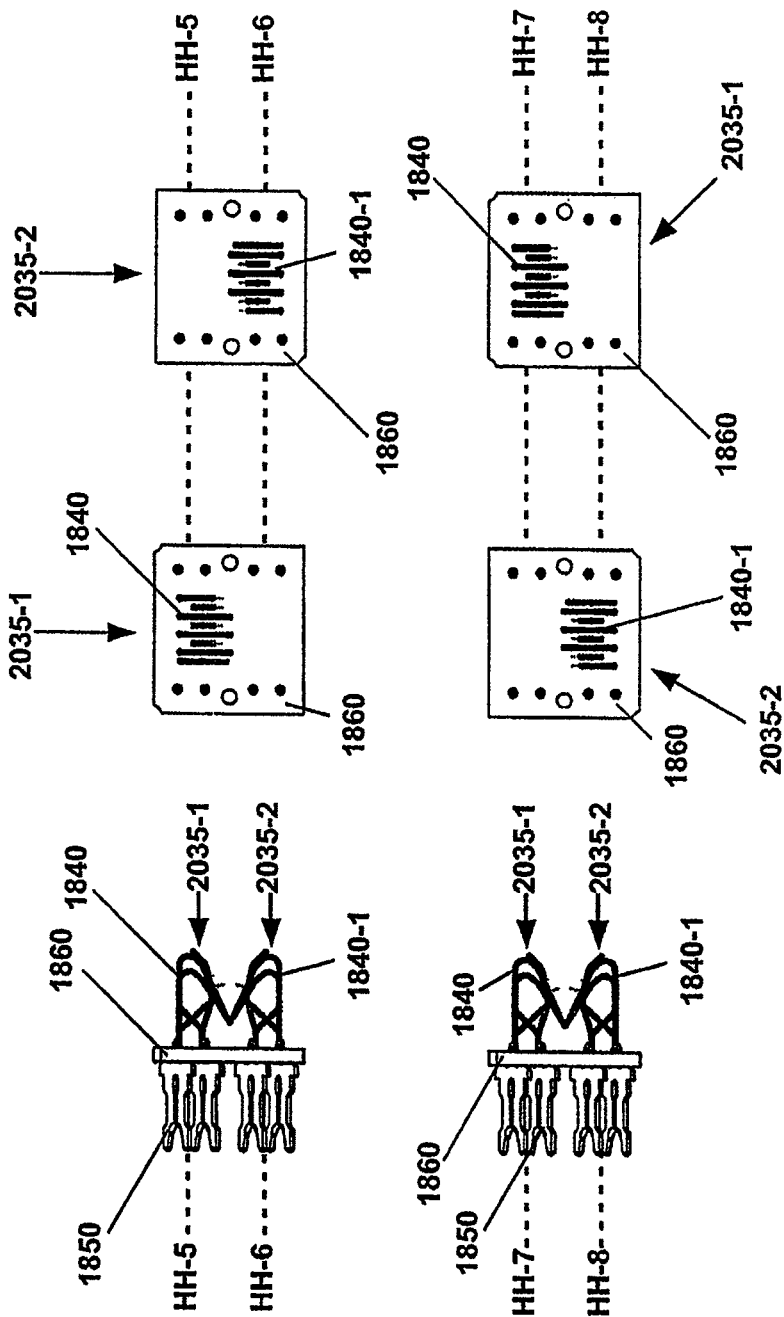

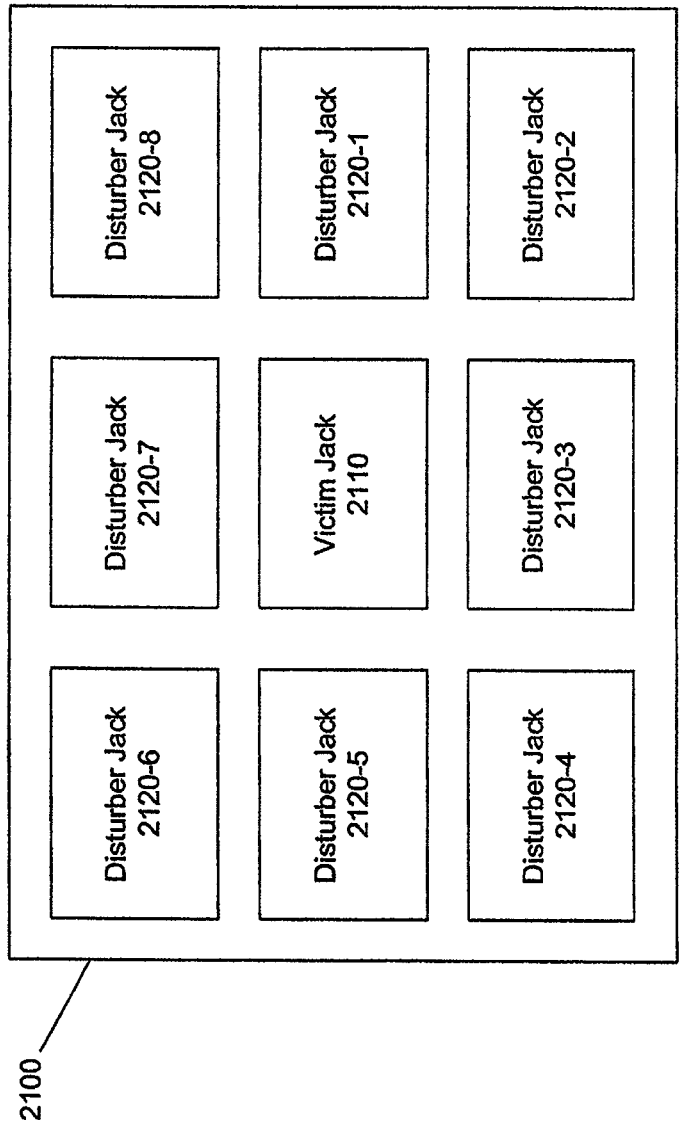

The 64 possible combinations are:

| J1-1 to J2-1 | J1-2 to J2-1 | J1-3 to J2-1 | J1-4 to J2-1 | J1-5 to J2-1 | J1-6 to J2-1 | J1-7 to J2-1 | J1-8 to J2 |
| J1-1 to J2-2 | J1-2 to J2-2 | J1-3 to J2-2 | J1-4 to J2-2 | J1-5 to J2-2 | J1-6 to J2-2 | J1-7 to J2-2 | J1-8 to J2 |
| J1-1 to J2-3 | J1-2 to J2-3 | J1-3 to J2-3 | J1-4 to J2-3 | J1-5 to J2-3 | J1-6 to J2-3 | J1-7 to J2-3 | J1-8 to J2 |
| J1-1 to J2-4 | J1-2 to J2-4 | J1-3 to J2-4 | J1-4 to J2-4 | J1-5 to J2-4 | J1-6 to J2-4 | J1-7 to J2-4 | J1-8 to J2 |
| J1-1 to J2-5 | J1-2 to J2-5 | J1-3 to J2-5 | J1-4 to J2-5 | J1-5 to J2-5 | J1-6 to J2-5 | J1-7 to J2-5 | J1-8 to J2 |
| J1-1 to J2-6 | J1-2 to J2-6 | J1-3 to J2-6 | J1-4 to J2-6 | J1-5 to J2-6 | J1-6 to J2-6 | J1-7 to J2-6 | J1-8 to J2 |
| J1-1 to J2-7 | J1-2 to J2-7 | J1-3 to J2-7 | J1-4 to J2-7 | J1-5 to J2-7 | J1-6 to J2-7 | J1-7 to J2-7 | J1-8 to J2 |
| J1-1 to J2-8 | J1-2 to J2-8 | J1-3 to J2-8 | J1-4 to J2-8 | J1-5 to J2-8 | J1-6 to J2-8 | J1-7 to J2-8 | J1-8 to J2 |

METHODS AND SYSTEMS FOR COMPENSATING FOR ALIEN CROSSTALK BETWEEN CONNECTORS

RELATED APPLICATIONS

The present application is a continuation of U.S. patent application Ser. No. 13/758,338, filed Feb. 4, 2013, now U.S. Pat. No. 9,153,913, which is a continuation of U.S. patent application Ser. No. 12/336,373, filed Dec. 16, 2008, now U.S. Pat. No. 8,369,513, which is a continuation of U.S. patent application Ser. No. 11/058,902, filed Feb. 15, 2005, now abandoned, which is a continuation-in-part of U.S. patent application Ser. No. 10/783,853, filed Feb. 20, 2004, now U.S. Pat. No. 7,187,766, related to U.S. Pat. Nos. 7,214,884 and 7,115,815, and each of which is incorporated by reference in its entirety. The present application is also related to applications entitled "METHODS AND SYSTEMS FOR MINIMIZING ALIEN CROSSTALK BETWEEN CONNECTORS" and "METHODS AND SYSTEMS FOR POSITIONING CONNECTORS TO MINIMIZE ALIEN CROSSTALK", each filed on the same date as the parent application.

BACKGROUND OF THE INVENTION

The present invention relates to methods and systems for minimizing alien crosstalk between connectors. Specifically, the methods and systems relate to isolation and compensation techniques for minimizing alien crosstalk between connectors for use with high-speed data cabling.

In the field of data communications, communications networks typically utilize techniques designed to maintain or improve the integrity of signals being transmitted via the network ("transmission signals"). To protect signal integrity, the communications networks should, at a minimum, satisfy compliance standards that are established by standards committees, such as the Institute of Electrical and Electronics Engineers (IEEE). The compliance standards help network designers provide communications networks that achieve at least minimum levels of signal integrity as well as some standard of interoperability.

One obstacle to maintaining adequate levels of signal integrity, known as crosstalk, adversely affects signal integrity by causing capacitive and inductive coupling between the transmission signals. Specifically, electromagnetic interference produced by one transmission signal may couple to another transmission signal and thereby disrupt or interfere with the affected transmission signal. The electromagnetic interference tends to emanate outwardly from a source transmission signal and undesirably affect any sufficiently proximate transmission signal. As a result, crosstalk tends to compromise signal integrity.

The effects of crosstalk increase when transmission signals are more proximate to one another. Consequently, typical communications networks include areas that are especially susceptible to crosstalk because of the proximity of the transmission signals. In particular, the communications networks include connectors that bring transmission signals into close proximity to one another. For example, the conductive pins of a traditional connector, such as a jack, are placed proximate to one another to form a convenient connection configuration, usually within the compact spaces of the connector. While such compact pin arrangements may be physically economical as a convenient connecting medium, the same pin arrangements tend to produce nightmarish crosstalk between the pins.

Due to the susceptibility of traditional connectors to crosstalk, conventional communications networks have employed a number of techniques to protect the transmission signals against crosstalk within the connector. For example, different arrangements or orientations of the connector pins have been used to reduce pin-to-pin crosstalk. Another known technique includes connecting the pins to conductive elements that are relationally shaped or positioned to induce coupling that tends to compensate for the crosstalk between the pins. Another compensation technique involves connecting the pins of a connector to conductive elements of a printed circuit board (PCB), with the conductive elements being relationally positioned or shaped to cause compensational coupling between them.

Intra-connector techniques for combating crosstalk, such as those described above, have helped to satisfactorily maintain the signal integrity of traditional transmission signals. However, with the widespread and growing use of computers in communications applications, the ensuing volumes of data traffic have accentuated the need for communications networks to transmit the data at higher speeds. When the data is transmitted at higher speeds, signal integrity is more easily compromised due to increased levels of interference between the high-speed transmission signals carrying the data. In particular, the effects of crosstalk are magnified because the high-speed signals produce stronger electromagnetic interference levels as well as increased coupling distances.

The magnified crosstalk associated with high-speed signals can significantly disrupt the transmission signals of conventional network connectors. Of special concern is one form of crosstalk that traditional connectors were able to overlook or ignore when transmitting traditional data signals. This form of crosstalk, known as alien crosstalk, describes the coupling effects between connectors. For example, high-speed data signals traveling via a first connector produce electromagnetic interference that couples to high-speed data signals traveling via an adjacent connector, adversely affecting the high-speed data signals of the adjacent jack. The magnified alien crosstalk produced by the high-speed signals can easily compromise the integrity of the transmission signals of an adjacent connector. Consequently, the transmission signals may become unrecognizable to a receiving device, and may even be compromised to the point that the transmission signals no longer comply with the established compliance standards.

Conventional connectors are ill-equipped to protect high-speed signals from alien crosstalk. Conventional connectors have largely been able to ignore alien crosstalk when transmitting traditional data signals. Instead, conventional connectors utilize techniques designed to control intra-connector crosstalk. However, these techniques do not provide adequate levels of isolation or compensation to protect from connector-to-connector alien crosstalk at high transmission speeds. Moreover, such techniques cannot be applied to alien crosstalk, which can be much more complicated to compensate for than is intra-connector crosstalk. In particular, alien crosstalk comes from a number of unpredictable sources, especially in the context of high-speed signals that typically use more transmission signals to carry the signal's increased bandwidth requirements. For example, traditional transmission signals such as 10 megabits per second and 100 megabits per second Ethernet signals typically use only two pin pairs for propagation through conventional connectors. However, higher speed signals require increased bandwidth. Accordingly, high-speed signals, such as 1 gigabit per second and 10 gigabits per second Ethernet signals, are usually transmitted in full-duplex mode (two-way transmission over a pin pair) over more than two pin pairs, thereby increasing the number of sources of crosstalk. Consequently, the known intra-connector techniques of conventional connectors cannot predict or overcome alien crosstalk produced by high-speed signals.

Although other types of connectors have achieved levels of isolation that may combat the alien crosstalk produced by high-speed transmission signals, these types of connectors have shortcomings that make their use undesirable in many communications systems, such as LAN communities. For example, shielded connectors exist that may achieve adequate levels of isolation to protect high-speed signal integrity, but these types of shielded connectors typically use a ground connection or can be used only with shielded cabling, which costs considerably more than unshielded cabling. Unshielded systems typically enjoy significant cost savings, which savings increase the desirability of unshielded systems as a transmitting medium. Moreover, conventional unshielded twisted pair cables are already well-established in a substantial number of existing communications systems. Further, inasmuch as ground connections may become faulty, shielded network systems run the risk of the ungrounded shields acting as antennae for electromagnetic interference.

In short, alien crosstalk is a significant factor for protecting the signal integrity of high-speed signals being transmitted via data communications networks. Conventional network connectors cannot effectively and accurately transmit high-speed data signals. Specifically, the conventional connectors for use in unshielded cabling networks do not provide adequate levels of compensation or isolation from alien crosstalk.

SUMMARY OF THE INVENTION

The present invention relates to methods and systems for minimizing alien crosstalk between connectors. Specifically, the methods and systems relate to isolation and compensation techniques for minimizing alien crosstalk between connectors for use with high-speed data cabling. A frame can be configured to receive a number of connectors. A number of shield structures may be positioned to isolate at least a subset of the connectors from one another. The connectors can be positioned to move at least a subset of the connectors away from alignment with a common plane. A signal compensator may be configured to adjust a data signal to compensate for alien crosstalk. The connectors are configured to efficiently and accurately propagate high-speed data signals by, among other functions, minimizing alien crosstalk.

BRIEF DESCRIPTION OF THE DRAWINGS

Certain embodiments of present methods and systems will now be described, by way of examples, with reference to the accompanying drawings, in which:

FIG. 17 is a perspective view of an embodiment of a jack assembly with adjacent jacks positioned at different angles with respect to a surface of the jack assembly.

FIG. 18B is a side view of conductors of the staggered jacks of FIG. 18A.

FIG. 18C shows a top view of the conductors of the staggered jacks of FIG. 18B.

FIG. 19A is a perspective view of an embodiment of a jack assembly with adjacent jacks offset from one another.

FIG. 19B is a side view of conductors of the jack assembly of FIG. 19A.

FIG. 19C shows a front view of the conductors of FIG. 19B.

FIG. 20B is a side view of conductors of the jack assembly of FIG. 20A.

FIG. 20C is a front view of the conductors of FIG. 20B.

FIG. 21 is a block diagram of an embodiment of a jack assembly for use in determining alien crosstalk between jacks.

DETAILED DESCRIPTION

I. Introduction and Definitions

The present invention relates to methods and systems for minimizing alien crosstalk between connectors. Specifically, the methods and systems relate to isolation and compensation techniques for minimizing alien crosstalk between connectors for use with high-speed data cabling.

Throughout the detailed description and the claims, the terms "connector" and "jack" are meant to be understood broadly as any mechanism for providing an electrical connection between conductors used for the transmission of data signals. A jack can include, but is not limited to, a socket for receiving a plug and a number of insulation displacement contacts (IDC) for receiving the insulated conductors of a data cable's twisted pairs. The jack provides an electrical connection between its IDC's and the conductors of the socket.

Throughout the detailed description and the claims, reference is made to isolation and compensation techniques for minimizing alien crosstalk. An isolation technique is meant to be understood broadly as any system or method that tends to isolate connectors to prevent or at least reduce the effects that the alien crosstalk generated by one connector has on another connector. A compensation technique is meant to be understood broadly as any system or method that tends to adjust a data signal to compensate for the coupling effects of alien crosstalk from another connector. The present methods and systems contemplate using any combination or subset of isolation and compensation techniques to minimize the effects of alien crosstalk between connectors.

II. Isolation Views

A. Shield Views

Figure 1:
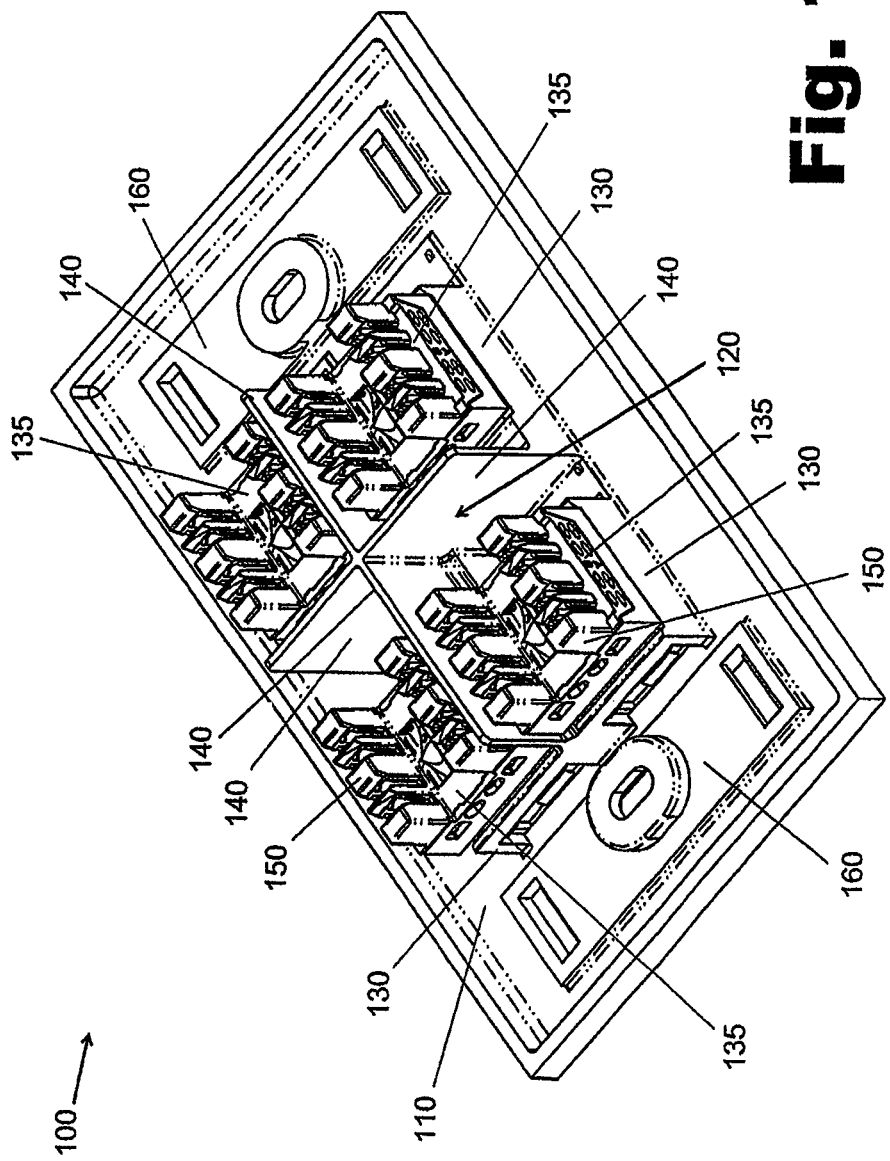
FIG. 1 shows a perspective view of a jack assembly according to one embodiment of the invention.

Referring now to the drawings, FIG. 1 shows a perspective view of a jack assembly 100 according to one embodiment of the invention. The jack assembly 100 can include a frame 110 and a shield structure 120. The frame 110 forms a number of jack receptacles 130 for receiving jacks 135. The shield structure 120 may include a number of shield sections 140, which are preferably positioned to separate (i.e., isolate) the received jacks 135 from one another. Such a positioning helps minimize alien crosstalk between the jacks 135, especially between adjacently positioned jacks 135.

The frame 110 is configured to receive and support a number of the jacks 135. Specifically, the frame 110 can form the jack receptacles 130 for housing the received jacks 135. The jack receptacles 130 should be shaped to fittingly support the received jacks 135 in fixed positions. The jack receptacles 130 shown in FIG. 1 comprise walls forming orifices for receiving the jacks 135. Preferably, the jack receptacles 130 and the jacks 135 are complimentarily shaped to promote secure housing of said jacks 135 in position.

The frame 110 is not limited to a specific shape or structure. The frame 110 can be a variety of different shapes so long as the frame 110 can house the jacks 135. The frame 110 of FIG. 1 comprises a faceplate. In other embodiments, the frame 110 may be shaped differently for use with other structures, such as a patch panel. Some embodiments of the jack assembly 100 discussed below illustrate different shapes of the frame 110.

As shown in FIG. 1, the frame 110 can include mounting structures 160 for mounting the frame 110 to a fixture for support. The mounting structures 160 of FIG. 1 include orifices for receiving a screw or other object capable of fixing the frame 110 to a support structure.

The jacks 135 should be configured to electrically connect two separate electrical conductors together. The jack 135 can include insulation displacement contact towers 150 (hereinafter "the IDC towers 150") extending from a surface of the jack 135 to form the IDC's that can receive and establish electrical contact with the insulated conductors of a cable. Although not shown in FIG. 1, the jack 135 also includes a socket 155 (see FIG. 12) having conductors for receiving and establishing electrical contact with a plug. The IDC's and the socket 155 conductors of the jack 135 are electrically connected to each other by the jack 135. Accordingly, the jack 135 can establish an electrical connection between the conductors received by the IDC's and the plug received by the socket 155. In some embodiments, the jack 135 comprises a recommended jack (RJ), such as an RJ-45 or RJ-48 type jack.

The shield structure 120 should be positioned to isolate the adjacent jacks 135 from one another, thereby minimizing alien crosstalk between the adjacent jacks 135. As shown in FIG. 1, the shield structure 120 can be positioned between the adjacent jacks 135. Specifically, the shield structure 120 may include any number of the shield sections 140. The shield sections 140 can be positioned between the adjacent jacks 135.

Preferably, the shield structure 120 isolates the IDC's of the jack 135 from the IDC's of an adjacently positioned jack 135. This isolation helps minimize the alien crosstalk that can otherwise occur between conductors received by the IDC's of the adjacent jacks 135. In FIG. 1, the shield structure 120 includes shield sections 140 that are positioned between the IDC's of the adjacent jacks 135. The shield structure 120 should comprise shapes and materials that function to isolate the adjacent jacks 135. Preferably, the shield structure 120 extends to a height that is substantially the same as or higher than the height of the jacks 135. This helps reduce alien crosstalk by separating the IDC's of the jacks 135 from one another.

The shield structure 120, including the shield sections 140, may be a wide variety of different shapes, thickness, and/or sizes, so long as the shield structure 120 helps reduce alien crosstalk between the adjacent jacks 135. For example, the shield structure 120, including the shield sections 140, may be thick to better isolate the adjacent jacks 135. Alternatively, the shield structure 120 can be thin for logistical purposes, so long as the shield structure 120 reduces alien crosstalk. In regards to shapes of the shield structure 120, FIG. 1 illustrates generally planar shield sections 140 extending away from a surface of the frame 110 to separate the adjacent jacks 135. Other embodiments discussed below show some of the alternative configurations of the shield structure 120 that can minimize alien crosstalk between the adjacent jacks 135.

As shown in FIG. 1, the shield structure 120 can be fixed to the frame 110. For example, the shield structure 120 may be permanently part of the frame 110 and extend away from the frame 110 to separate the received jacks 135. In one embodiment, the shield structure 120 and the frame 110 are formed from a unitary material, and may be molded. Alternatively, the shield structure 120 can be separate from the frame 110, but configured to be fixed to the frame 110 by some form of securing mechanism, such as a snap-fit mechanism. In other embodiments, the shield structure 120 can be supported by the jack 135. Examples of different configurations of the shield structure 120 are discussed in detail below.

Because the shield structure 120 can physically separate the adjacent jacks 135, it can also electrically isolate the adjacent jacks 135 from one another. To help facilitate the electrical isolation of the adjacent jacks 135, the shield structure 120 should comprise a conductive material that functions to obstruct or minimize the flow of electrical signals away from their intended paths, including the coupling signals of alien crosstalk. In other words, the conductive material of the shield structure 120 should act as an electrical barrier between the adjacent jacks 135.

The conductive material can comprise any material and application form that helps to minimize alien crosstalk. The material may include any conductive material, including but not limited to nickel, copper, and conductive paints, inks, and, sprays. For example, the shield structure 120 can include conductive shield sections 140, such as metal-based members, positioned to separate the adjacent jacks 135. The conductive material may include a spray-on coating of conductive material applied to at least a portion of the shield structure 120. The spray-on coating may be applied to a supporting material, such as some type of plastic.

The shield structure 120 may comprise conductive elements that disrupt alien crosstalk without making the shield structure 120 a conductive structure. For example, the shield structure 120 can include a non-conductive material, such as a resinous or plastic material, which is impregnated with conductive elements. The conductive elements may include but are not limited to conductive carbon loads, stainless steel fibers, micro-spheres, and plated beads. The conductive elements can be positioned such that the shield structure 120 is not conductive. This helps prevent any undesirable short-circuiting with the shield structure 120. The conductive elements should be positioned with sufficient density to disrupt alien crosstalk between adjacent jacks 135.

Other members of the jack assembly 100 may include the conductive material to help isolate the jacks 135. For example, the frame 110 can include the conductive elements. In an embodiment discussed below, the jack 135 includes conductive materials.

Preferably, the conductive material of the shield structure 120 is not grounded. An ungrounded conductive shield structure 120 can function to block or at least disrupt alien crosstalk signals. Further, unlike lengthy shields used with shielded cabling, the conductive materials of the shield structure 120 can be sized such that they do not produce harmful capacitances when not grounded. By being able to function without being grounded, the shield structure 120 can isolate the adjacent jacks 135 of unshielded cabling systems, which make up a substantial part of deployed cabling systems. Consequently, the ungrounded shield structure 120 is able to avoid many of the costs, dangers, and hassles that are inherent to a shielded cabling system, including the potentially hazardous effects of a faulty ground connection.

Further, the conductive materials of the shield structure 120 can be electrically isolated such that they do not interfere with the data signals transmitted via the jacks 135. For example, the shield structure 120 may include an insulator to prevent its conductive materials from making electrical contact with any conductors associated with the jacks 135. The insulator can be applied over the conductive materials of the shield structure 120. For example, the insulator may be any non-conductive material that can be applied to the conductive materials, including a spray-on material. When applied, the insulator is helpful for preventing the conductors of an attached cable from inadvertently shorting via the shield structure 120. This is especially beneficial when the IDC towers 150 of one jack 135 are positioned proximate to the IDC towers 150 of an adjacent jack 135.

Further, the shield structure 120 may be positioned or shaped to keep its conductive materials electrically isolated. For example, the shield structure 120 can include thin shield sections 140 configured to fit between the adjacent jacks 135 without electrically contacting cabling conductors that are connected to the IDC's of the jacks 135.

Figure 2:
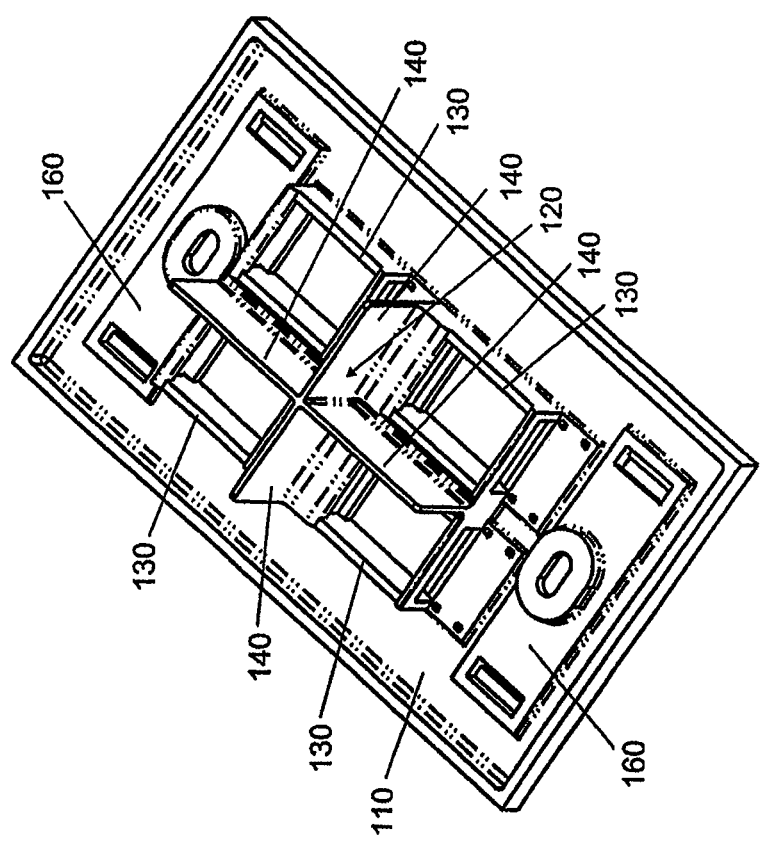
FIG. 2 shows a perspective view of the frame and the shield structure of FIG. 1.

FIG. 2 shows a perspective view of the frame 110 and the shield structure 120 of FIG. 1. As shown in FIG. 2, the shield structure 120 can be permanently fixed to the frame 110 and extend away from the frame 110 at positions between the jack receptacles 130. Accordingly, the shield structure 120 is positioned to separate the jacks 135 when the jacks 135 have been received by the jack receptacles 130. The shield structure 120 shown in FIG. 2 includes four shield sections 140, and each shield section 140 is positioned between the adjacent jack receptacles 130.

The frame 110 and shield structure 120 shown in FIG. 2 can be conveniently installed in a data network to reduce alien crosstalk, even in an existing data network. For example, the frame 110 can be easily substituted for already deployed faceplates or panels, thereby providing the shield structure 120 between the connectors of an existing data network.

Figure 3:
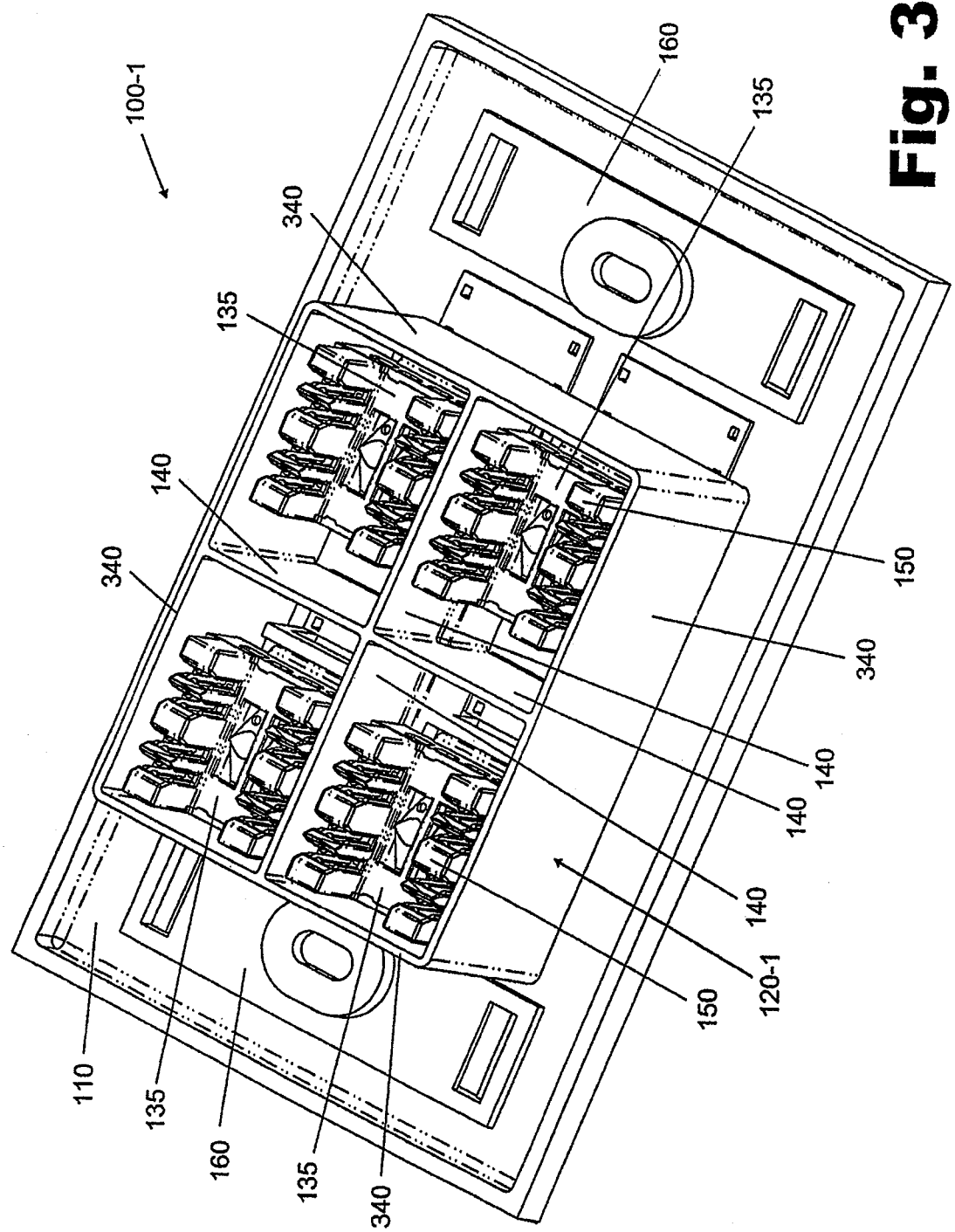
FIG. 3 is a perspective view of a second embodiment of the jack assembly of FIG. 1.

FIG. 3 is a perspective view of a second embodiment of the jack assembly 100 of FIG. 1. The jack assembly 100-1 shown in FIG. 3 includes a shield structure 120-1. The shield structure 120-1 includes the features of the shield structure 120 and further includes a number of outer shield sections 340 positioned along the outer edges of the jacks 135 to shield the jacks 135 from alien crosstalk generated by sources external of the jack assembly 100-1. For example, the outer shield sections 340 can isolate the jacks 135 of the jack assembly 100-1 from alien crosstalk generated by external jacks of adjacent jack assemblies, which may lack a shield structure 120-1. The jacks 135 positioned generally lateral from the jacks 135 of the jack assembly 100-1 are of particular concern. In FIG. 3, the outer shield sections 340 are positioned along each outer edge of the jacks 135, forming a perimeter of outer shield sections 340 about the jacks 135. The outer shield sections 340 should form at least a partial perimeter about the jacks 135.

Figure 4:
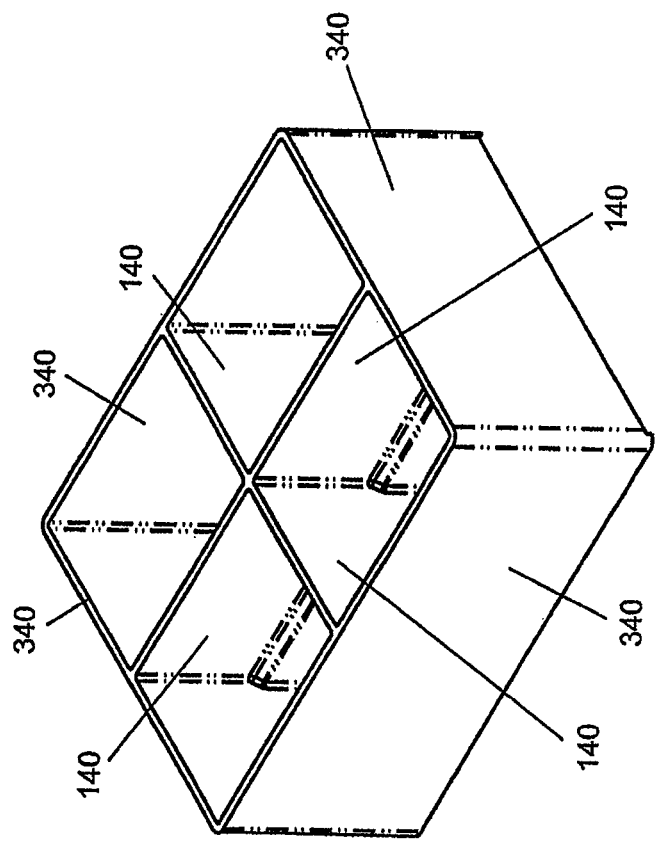
FIG. 4 is a perspective view of a shield structure according to the embodiment of FIG. 3.

FIG. 4 provides a perspective view of the shield structure 120-1 of FIG. 3. The outer shield sections 340 include the same features described above in relation to the shield sections 140 of the shield structure 120, including the conductive material that functions to obstruct alien crosstalk.

Figure 5:
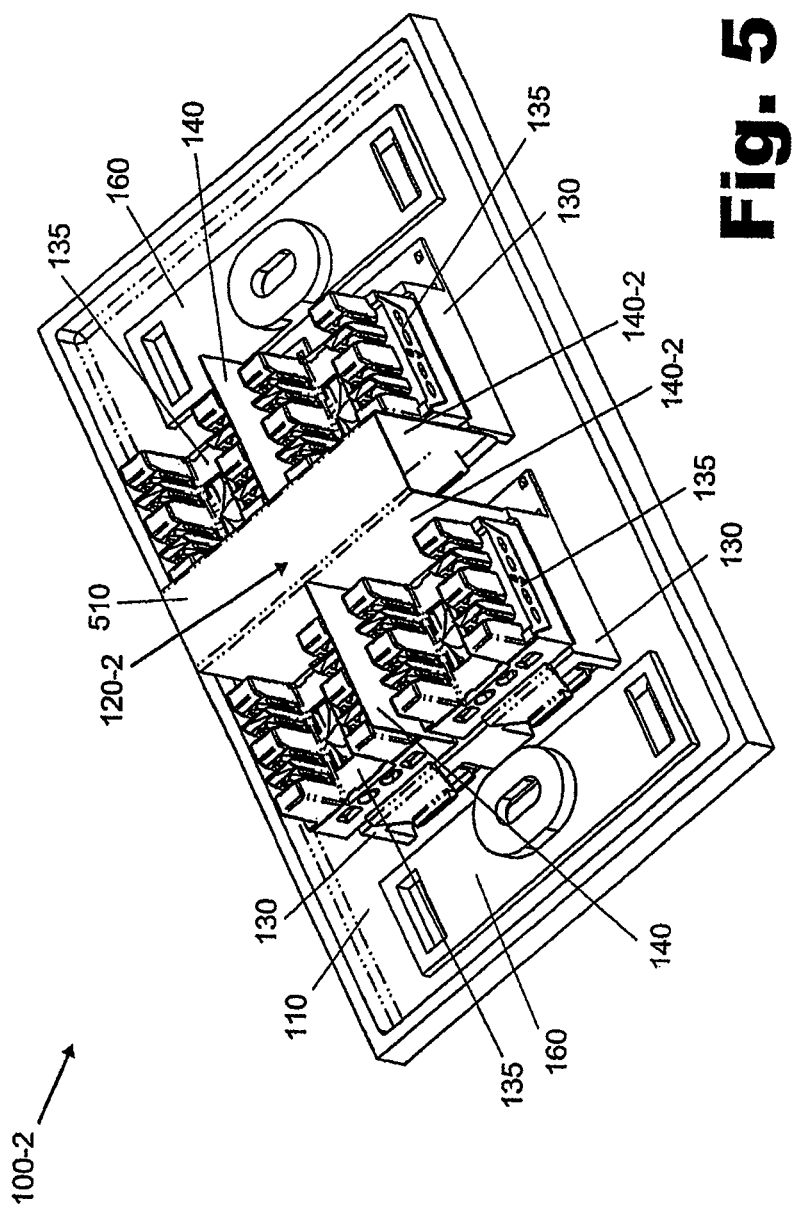
FIG. 5 shows a perspective view of a third embodiment of the jack assembly of FIG. 1.

FIG. 5 shows a perspective view of a third embodiment of the jack assembly 100 of FIG. 1. FIG. 5 shows a jack assembly 100-2 that includes a shield structure 120-2 inserted between the jack receptacles 130 to separate the received jacks 135. The shield structure 120-2 includes the same features of the shield structure 120. Further, the shield structure 120-2 can be configured to fittingly couple to the frame 110 to separate the adjacent jacks 135. Specifically, the shield structure 120-2 includes shield sections 140-2 configured to facilitate an easy insertion and/or removal of the shield structure 120-2 between the jacks 135.

The shield sections 140-2 can be arranged in wide variety of ways such that they can be fittingly coupled to the frame 110 and separate the jacks 135. As shown in FIG. 5, the shield sections 140-2 can be joined together by a joining member 510 such that the shield sections 140-2 and the joining member 510 form a generally U-shaped structure.

Figure 6:
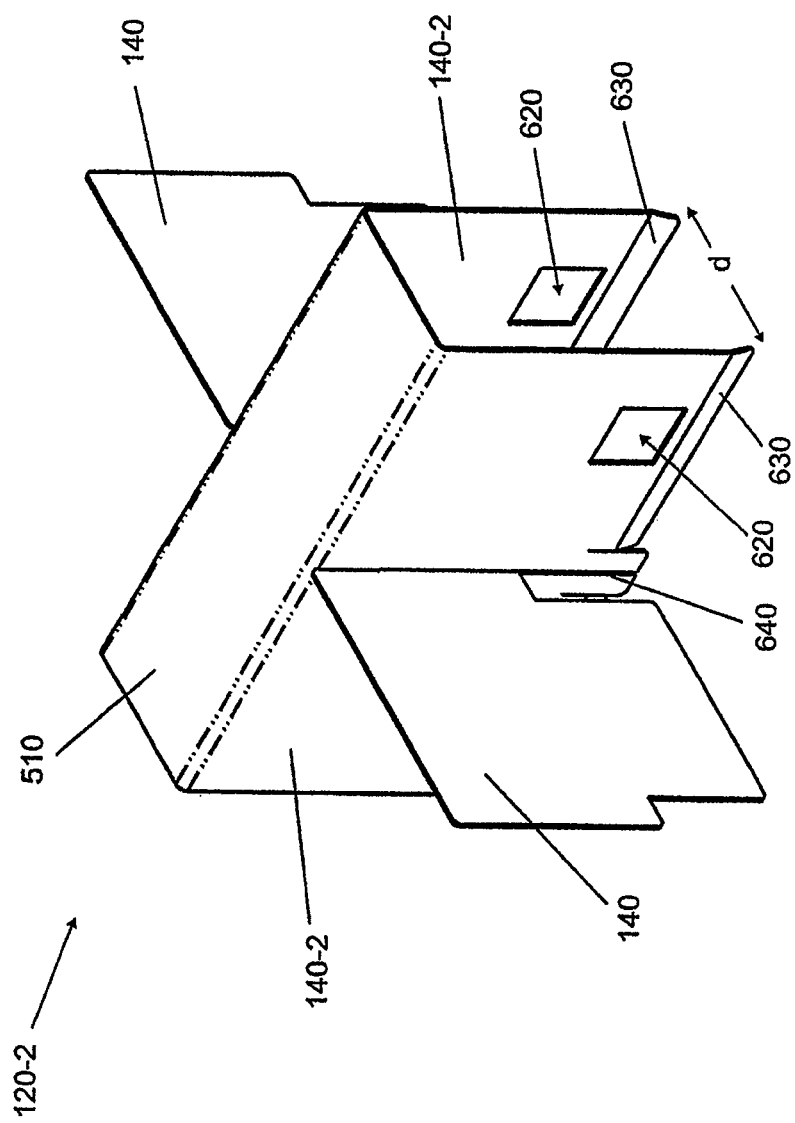
FIG. 6 shows a perspective view of a shield structure according to the embodiment shown in FIG. 5.

The joining member 510 can be any size that provides an optimal distance between the shield sections 140-2 so that the shield structure 120-2 can be fittingly coupled between the jack receptacles 130. FIG. 6 is a perspective view of the shield structure 120-2, where the distance (d) between the shield sections is indicated. The distance (d) should correspond with a space between the adjacent jack receptacles 135. The joining member 510 also provides stability to the shield structure 120-2.

The shield structure 120-2 should include a structure and/or aperture for coupling to the frame 110. As shown in FIG. 6, the shield sections 140-2 can include coupling apertures 620 for coupling to the frame 110. When the shield sections 140-2 are spaced apart by the specific distance (d), the coupling apertures 620 are configured to receive complimentary protrusions of the frame 110 to fix the shield structure 120-2 at a position between the adjacent jack receptacles 130. The shield sections 140-2 in combination with the joining member 510 should have spring-like characteristics. Accordingly, in some embodiments, the shield structure 120-2 is configured to snap-fit to the frame 110 at a position between the adjacent jack receptacles 130 such that when the shield structure 120-2 is in its final orientation, the apertures 620 are biased into engagement with their mating male members.

Further, as shown in FIG. 6, the shield sections 140-2 may include a sloped extension 630 configured to facilitate the coupling of the shield structure 120-2 to the frame 110. Specifically, the sloped extension 630 is configured to help the shield sections 140-2 compact together as the shield structure 120-2 moves into position to couple to the frame 110. Other mechanisms can be used to fix the shield structure 120-2 to the frame 110 so long as the shield structure 120-2 is positioned to separate the adjacent jacks 135 from one another.

The shield structure 120-2 can be configured to separate various arrangements of adjacent jacks 135. For example, the shield structure 120-2 may be configured to separate four jacks 135 into quadrant regions. Specifically, the shield sections 140-2 run parallel to a first axis and separate the four jacks 135 into two areas. The shield sections 140-2 include slots 640 for receiving a number of the shield sections 140. As shown in FIG. 6, slots 640 may receive the shield sections 140 such that the shield sections 140 run along a second axis generally perpendicular to the first axis such that the shield sections 140 half each of the two areas, thereby separating the jacks 135 into quadrants. Other embodiments of the shield structure 120-2 can be used to separate different numbers or arrangements of adjacent jacks 135 from one another.

Figure 7:
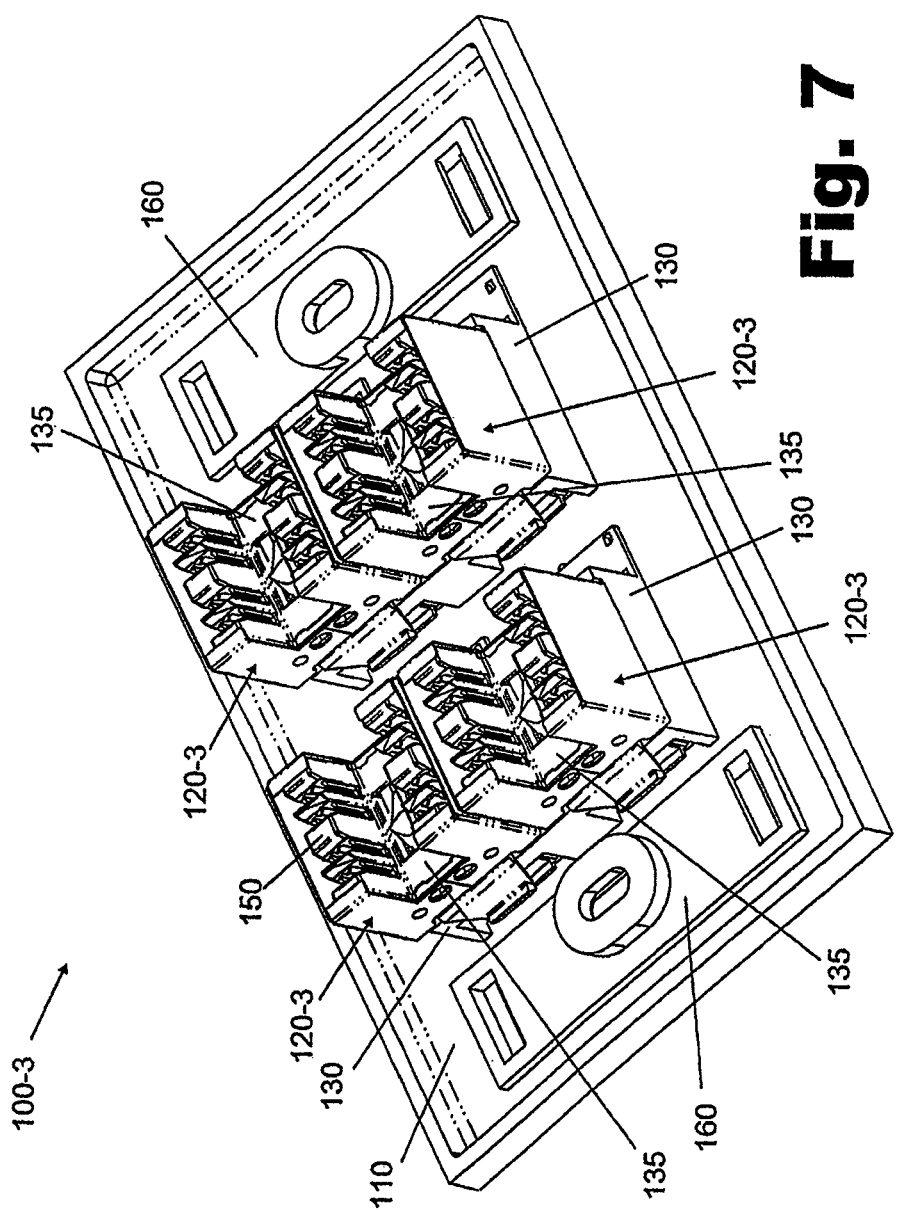
FIG. 7 is a perspective view of a fourth embodiment of the jack assembly of FIG. 1.

FIG. 7 is a perspective view of a fourth embodiment of the jack assembly 100 of FIG. 1. The jack assembly 100-3 shown in FIG. 7 includes a number of shield structures 120-3 positioned to isolate the received jacks 135. The shield structure 120-3 can be fixedly coupled to the jack 135 or to the jack receptacle 130 such that the shield structure 120-3 forms a perimeter about the jack 135. In FIG. 7, the shield structure 120-3 forms a perimeter about the lateral sides of the jack 135, and is thereby positioned to act as a barrier to alien crosstalk on the lateral sides of the jack 135. When the adjacent jacks 135 are each fitted with the shield structure 120-3, the shield structure 120-3 reduces alien crosstalk between the adjacent jacks 135. Other embodiments of the shield structure 120-3, some of which will be discussed below, form only a partial perimeter about the jack 135.

Figure 8:
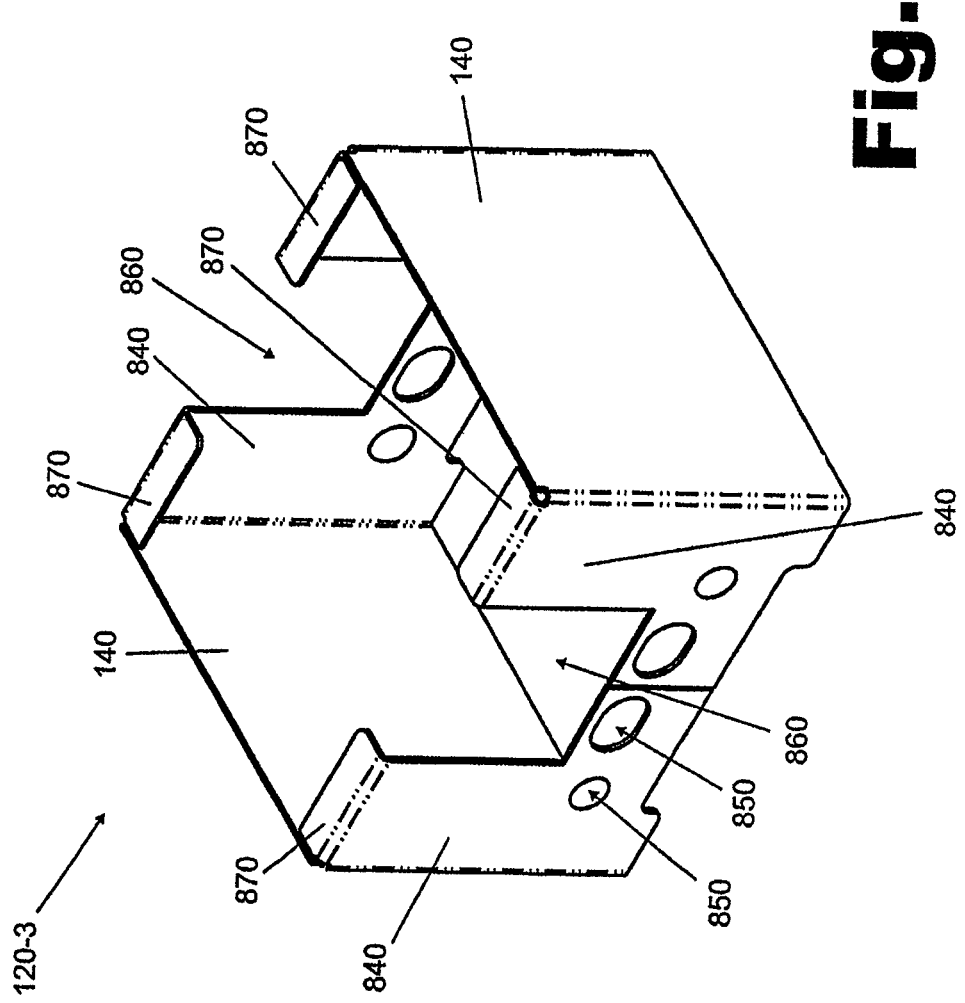
FIG. 8 is a perspective view of a shield structure according to the embodiment shown in FIG. 7.

FIG. 8 shows a perspective view of the shield structure 120-3 of FIG. 7. The shield structure 120-3 shown in FIG. 8 can include a number of the shield sections 140 that are configured to fit between the adjacent jacks 135 when the shield structure 120-3 is positioned about the jack 135, thereby isolating the adjacent jacks 135 from one another. In FIG. 8, the shield structure 120-3 includes two shield sections 140 spaced apart from and generally parallel to one another such that they can fit along opposite sides of the jack 135. Preferably, the shield sections 140 are positioned along the sides of the jack 135 having the IDC towers 150 to obstruct the alien crosstalk generated at the IDC's of the jack 135.

The two shield sections 140 can be joined together by shield members 840. As shown in FIG. 8, opposite edges of each of the shield sections 140 is attached to two shield members 840. The shield members 840 extend away from the shield section 140 at an angle generally perpendicular to the plane of the shield section 140 such that the two shield members 840 are generally parallel to each other and separated by approximately the length of the shield section 140. The two shield sections 140 with their respective shield members 840 should be oppositely oriented so that when placed next to each other, the shield members 840 of a first of the shield sections 140 couples to the shield members 840 of a second of the shield sections 140. This configuration forms the rectangular-shaped shield structure 120-3 shown in FIG. 8. Accordingly, the shield structure 120-3 can comprise two parts that can be combined to form a perimeter about the jack 135. The perimeter of the shield structure 120-3 should be configured to fit around the lateral edges of the jack 135. Other embodiments of the shield structure 120-3 can be shaped differently, so long as the shield structure 120-3 forms a shielding perimeter about the jack 135 that functions to minimize alien crosstalk.

The shield members 840 may include any of the features discussed above in relation to the shield sections 140. For example, the shield members 840 should include a conductive material for obstructing alien crosstalk. As shown in FIG. 8, the shield members 840 may be positioned next to the corner IDC towers 150 of the jack 135 to obstruct alien crosstalk near the corner IDC's of the jack 135.

The shield structure 120-3 can include any mechanism for coupling to the jack 135 or the jack receptacle 130. For example, the shield structure 120-3 may include a number of coupling apertures 850 configured to receive a complementary protrusion of the jack 135 or of the jack receptacle 130. In FIG. 8, the shield members 840 each include two coupling apertures 850. Further, oppositely positioned shield members 840 should be separated by a distance conducive to the coupling apertures receiving the protrusions.

The shield structure 120-3 can be configured for easy installation about the jack 135, even when a cable is connected to the IDC's of the jack 135. For example, the shield structure 120-3 of FIG. 8 includes two halves that can be coupled to the jack 135 without having to be slid from the end of the attached cable up to the jack 135. Therefore, the shield structure 120-3 can be easily installed on the jacks 135 of existing cabling systems. As shown in FIG. 8, the shield structure 120-3 forms at least one recess 860 for receiving a cable that may be attached to the jack 135.

The shield members 840 can include brackets 870 that are configured to help the shield structure 120-3 fit about the jack 135. As shown in FIG. 8, the brackets 870 may be folded at some angle such that the brackets 870 are configured to rest against the corner IDC towers 150 of the jack 135 when the shield structure 120-3 is positioned about the jack 135. In addition, the brackets 870 can comprise a conductive material to help obstruct alien crosstalk near the top of the IDC towers 150.

Figure 9:
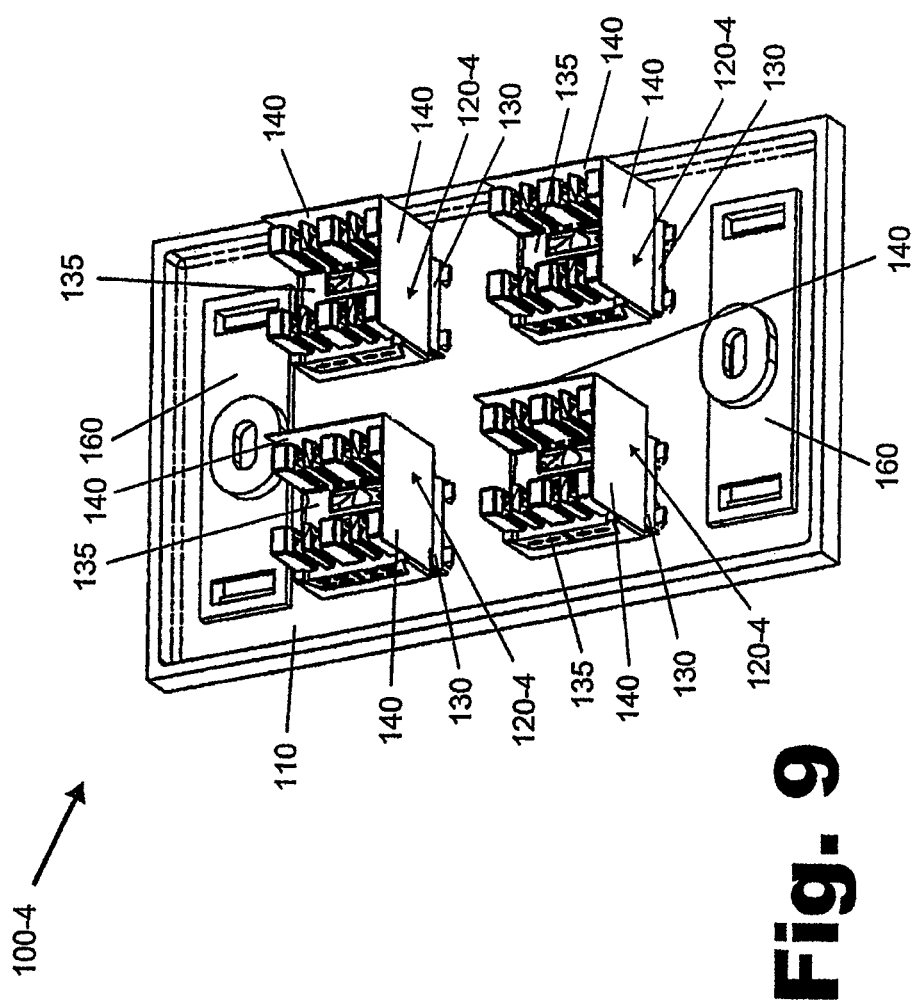
FIG. 9 is a perspective view of a fifth embodiment of the jack assembly of FIG. 1.
Figure 10:
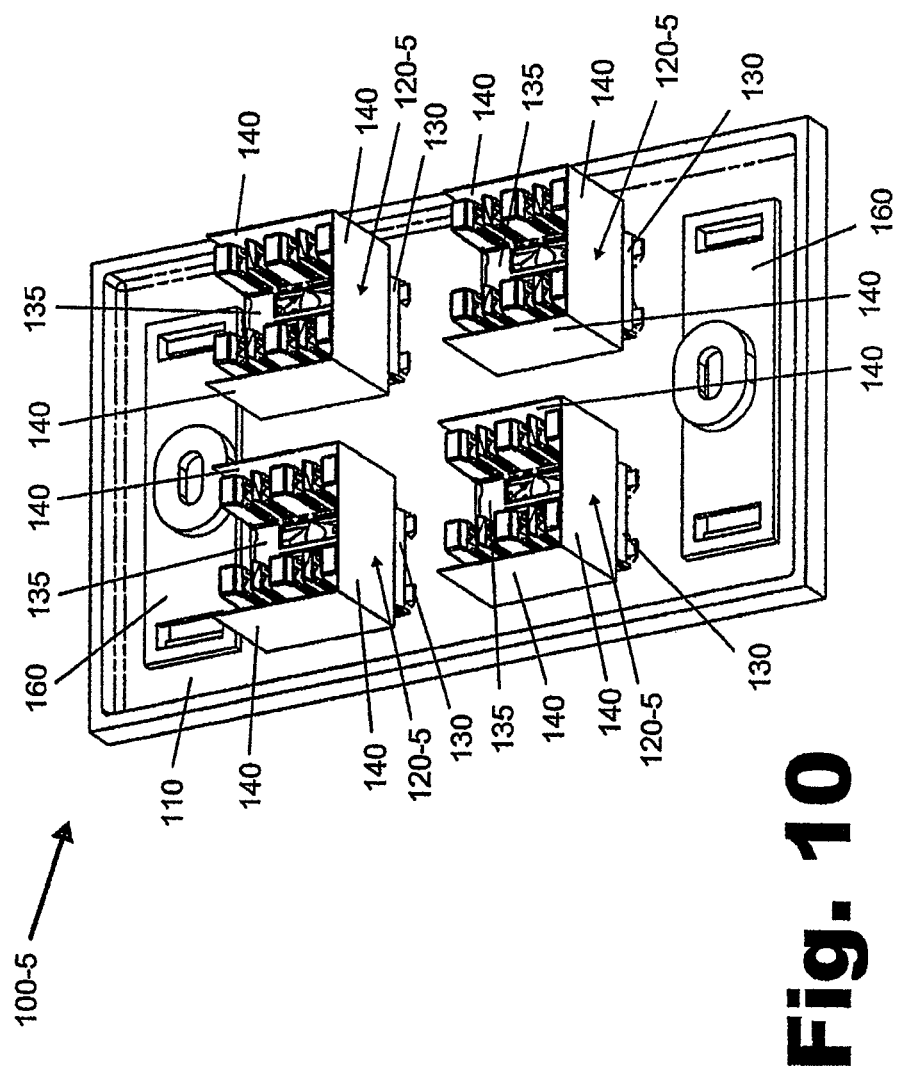
FIG. 10 is a perspective view of a sixth embodiment of the jack assembly of FIG. 1.

As mentioned above, the shield structure 120-3 can be configured to shield any number of sides of the jack 135 from alien crosstalk. For example, the number of shield sections 140 positioned along the jack 135 can vary. FIGS. 9-10 show embodiments for shielding two and three sides of the jack 135 respectively.

FIG. 9 is a perspective view of a fifth embodiment of the jack assembly 100 of FIG. 1. The jack assembly 100-4 shown in FIG. 9 includes a number of shield structures 120-4 positioned adjacent to the received jacks 135 in a configuration that will reduce alien crosstalk. The shield structure 120-4 includes two shield sections 140 that are positioned about two adjoining sides of the jack 135. When each of the shield structures 120-4 is positioned about the same sides of each of the received jacks 135, then there is at least one shield section 140 between each pair of adjacent jacks 135 of the jack assembly 100-4.

The shield sections 140 may be coupled to the jack 135 or the frame 110 (including the jack receptacles 135) in a number of different ways, including any of the ways discussed above. For example, although FIG. 9 shows the shield structure 120-4 coupled to the jack 135, the shield structure 120-4 can be coupled to the frame 110, including permanently coupled to the frame 110 as discussed in relation to the shield structure 120.

FIG. 10 is a perspective view of a sixth embodiment of the jack assembly 100 of FIG. 1. Similar to the jack assembly 100-4 shown in FIG. 9, the jack assembly 100-5 of FIG. 10 can include a shield structure 120-5 that is configured to shield a subset of sides of the jack 135. Specifically, the shield structure 120-5 is configured to shield three sides of the jack 135 rather than two as discussed in relation to FIG. 9. Accordingly, the shield structure 120-5 includes the same features discussed in relation to the shield structure 120-4.

Figure 11:
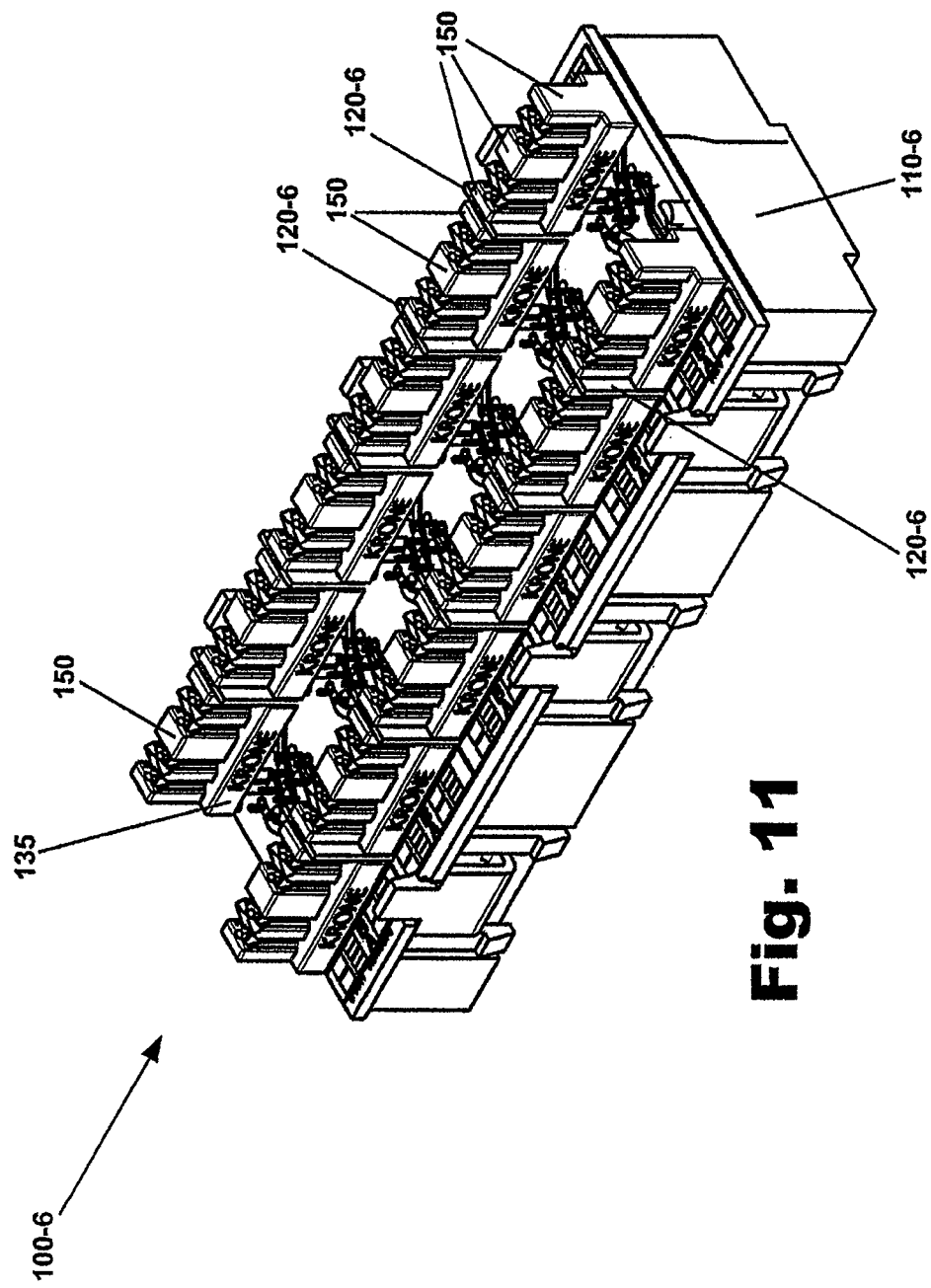
FIG. 11 is a perspective view of a seventh embodiment of the jack assembly of FIG. 1.

FIG. 11 is a perspective view of a seventh embodiment of the jack assembly 100 of FIG. 1. The jack assembly 100-6 shown in FIG. 11 includes the frame 110-6 configured to support a number of the jacks 135 in a row. As shown in FIG. 11, the jack assembly 100-6 can include six jacks 135 positioned in a row. The jack assembly 100-6 includes a number of shield structures 120-6 positioned between the adjacent jacks 135 to minimize alien crosstalk. The shield structures 120-6 can comprise a number of the shield sections 140.

As shown in FIG. 11, the shield structures 120-6 can be positioned between the IDC towers 150 of adjacent jacks 135. Preferably, at least one shield structure 120-6 is positioned between each pair the IDC towers 150 of each pair of adjacent jacks 135. This helps minimize alien crosstalk between potentially harmful generators of alien crosstalk— the IDC's of the adjacent jacks 135. The shield structures 120-6 can be positioned between the IDC towers 150 of adjacent jack 135 in other configurations. For example, the jacks 135 can be arranged in a column with the shield structures 120-6 positioned between the adjacent IDC towers 150 of adjacent jacks 135.

Figure 12:
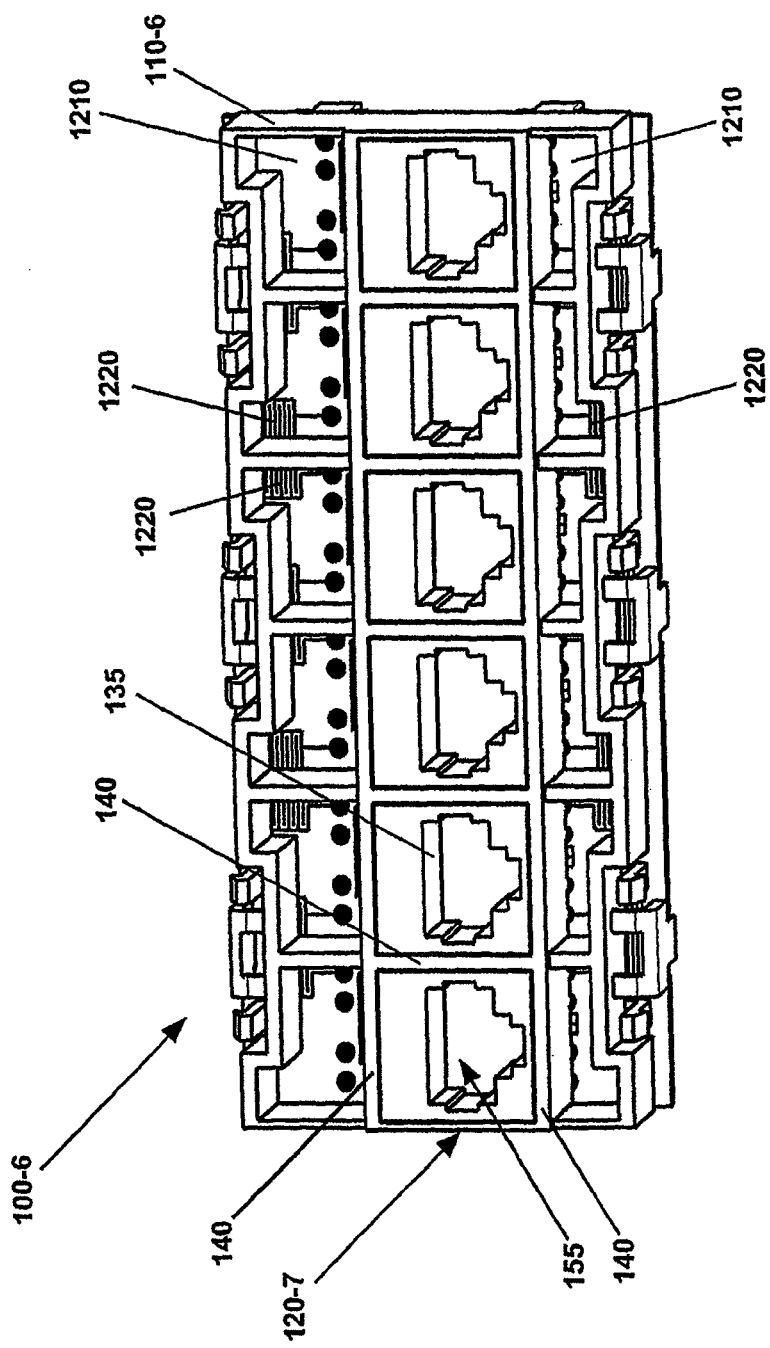
FIG. 12 is another perspective view of the jack assembly of FIG. 11.

FIG. 12 is another perspective view of the jack assembly 100-6 of FIG. 11. FIG. 12 shows a front perspective view of the jack assembly 100-6. Again, the frame 110-6 is configured to support a number of jacks 135 in a row. The forward portion of each of the jacks 135 includes the socket 155 configured to receive a plug as described above. The jack assembly 100-6 shown in FIG. 12 includes an embodiment of a shield structure 120-7 configured to isolate the jacks 135 from one another. As shown in FIG. 12, the shield structure 120-7 can include a number of the shield sections 140 configured to form a perimeter about each of the jacks 135. Specifically, the shield structure 120-7 can form a complete perimeter about the lateral sides of the socket 155 of each of the jacks 135. This helps minimize alien crosstalk between the conductor pins of the sockets 155 of the adjacent jacks 135.

Further, the jack assembly 100-6 can include a circuit board 1210 having a number of compensation mechanisms 1220 configured to adjust data signals to compensate for the effects of alien crosstalk. The circuit board 1210, compensation mechanisms 1220, and other compensation techniques will be discussed below in relation to various compensation views.

The jack assembly 100-6 can be positioned next to another jack assembly 100-6 and still isolate the adjacent jacks 135 from one another. Specifically, the shield structure 120-7 forms an outer perimeter about the jacks 135 that can obstruct alien crosstalk from external sources. Accordingly, the forward portion of the adjacent jacks 135 of the jack assembly 100-6 remain isolated when multiple jack assemblies 100-6 are positioned in a row, such as in the configuration shown in FIG. 13.

Figure 13:
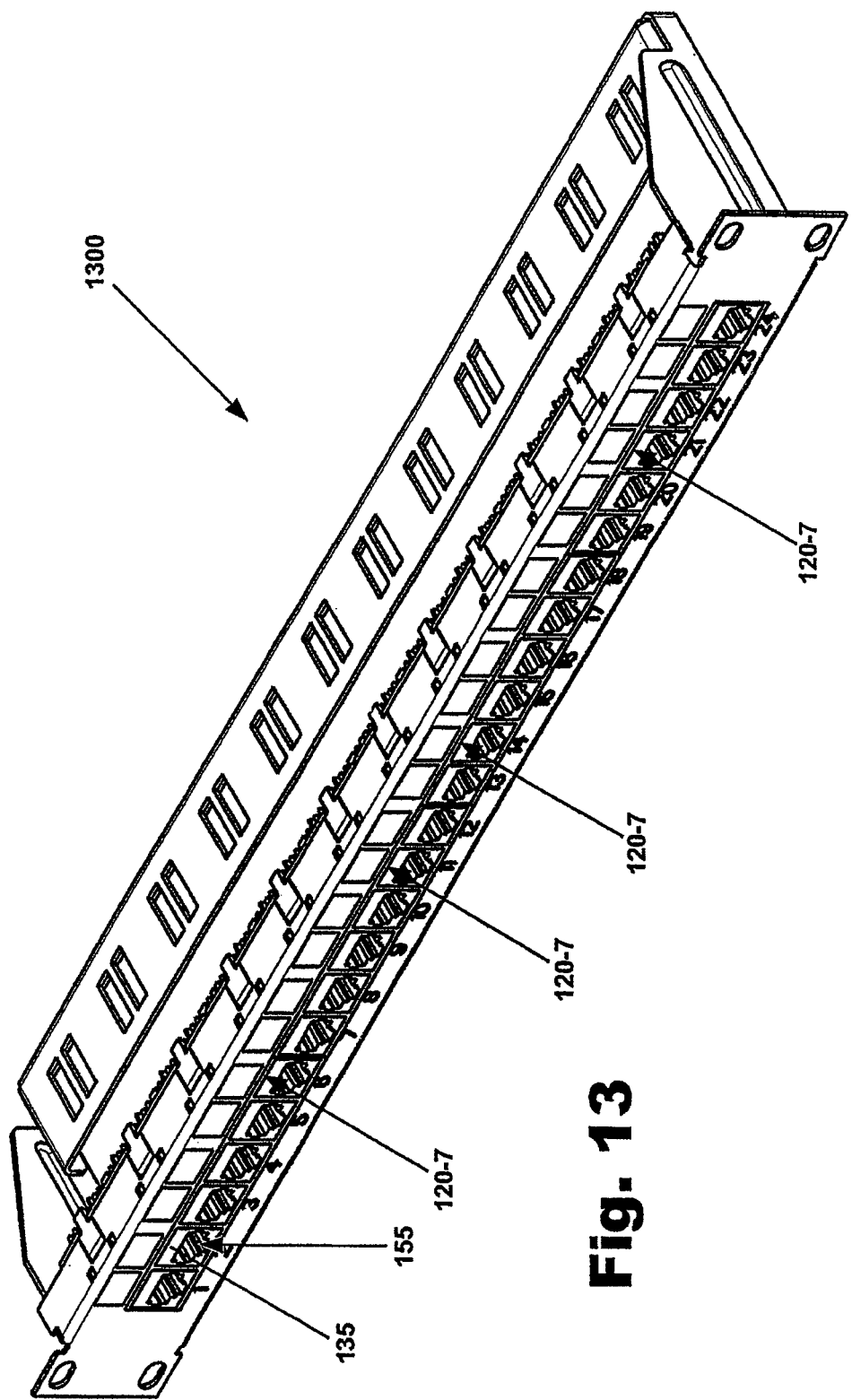
FIG. 13 is a perspective view on a panel having multiple jack assemblies of FIG. 12.
Figure 14:
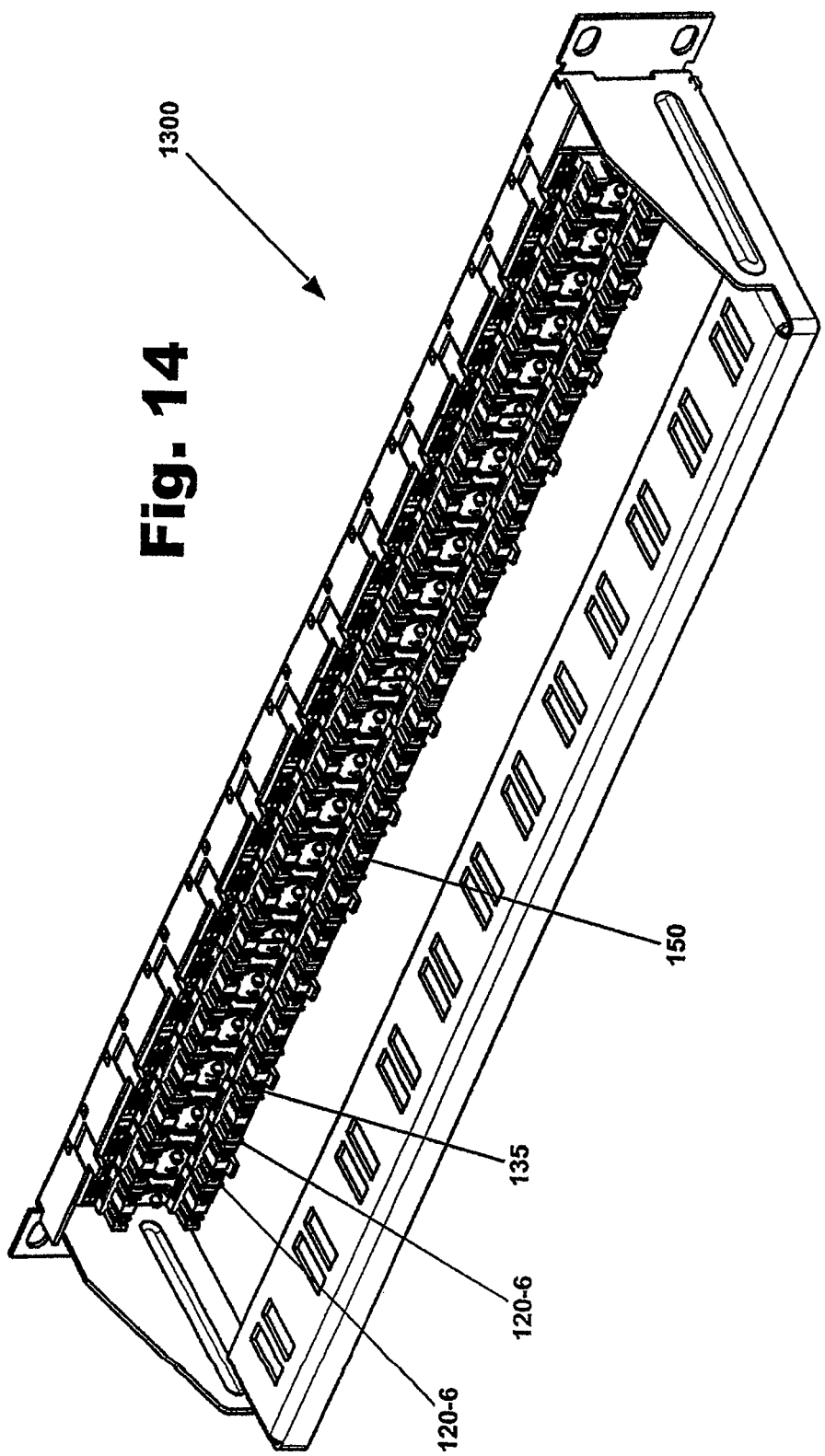
FIG. 14 is another perspective view of the panel of FIG. 13.

FIG. 13 is a perspective view of a panel 1300 having multiple jack assemblies 100-6 positioned in a row. As shown, the shield structures 120-7 of each of the jack assemblies 100-6 function to keep each of the jacks 135 of the panel separated from one another. The jack assemblies 100-6 may be arranged differently, such as stacked in a column, and the shield structures 120-7 continue to keep each of the jacks 135 isolated. The shield structure 120-7 includes all of the features for minimizing alien crosstalk discussed above in relation to the shield structure 120. FIG. 14 shows another perspective view of the panel 1300.

Figure 15A:
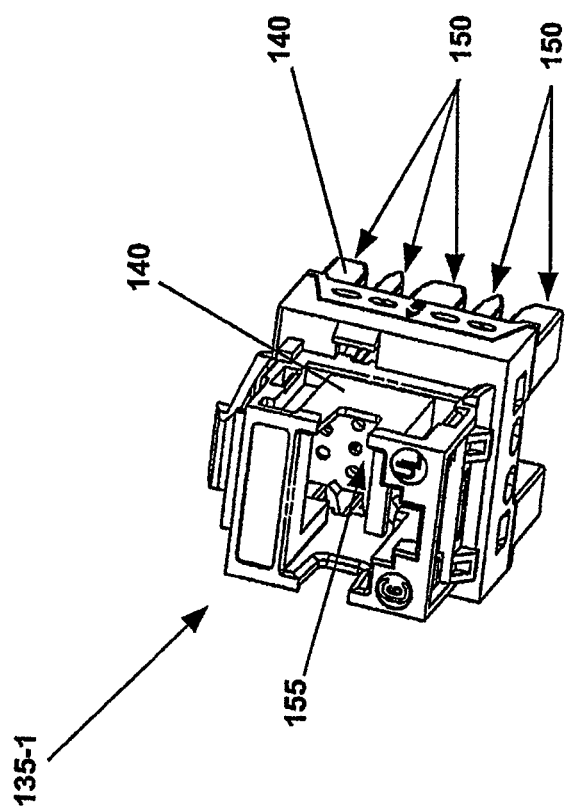
FIG. 15A is a perspective view of a jack having shielded surfaces.

FIG. 15A is a perspective view of another embodiment of the jack 135. The jack 135-1 shown in FIG. 15A can be included in any of the embodiments of the jack assemblies discussed above. The jack 135-1 includes the same features discussed above in relation to the jack 135. Further, the jack 135-1 can include a number of shield sections 140 on any combination of surfaces of the jack 135-1. Preferably, the shield sections 140 are thin such that the jack 135 can still be received and fit within said frame 110. The shield sections 140 can minimize alien crosstalk by being positioned on surfaces of the jack 135-1 that tend to be located between the conductors of the jack 135-1 and the conductors of an adjacent jack 135-1, such as lateral surfaces of the jack 135-1.

As mentioned above, the shield sections 140 can comprise a spray-on coating of conductive material applied to a surface of the jack 135-1. Preferably, the shield sections 140 are applied to surfaces of the jack 135-1 that are likely to be positioned such that the shield sections 140 are between the jack 135-1 and any adjacent jacks 135-1. For example, the shield sections 140 can be applied to the lateral surfaces of the jack 135-1 to help isolate the jack 135-1 from any laterally positioned adjacent jacks 135-1, such as other jacks 135-1 included in a faceplate or panel. In one embodiment, the surfaces of the IDC towers 150 include the shield sections 140 to help minimize alien crosstalk between the IDC's of the jack 135-1.

Figure 15B:
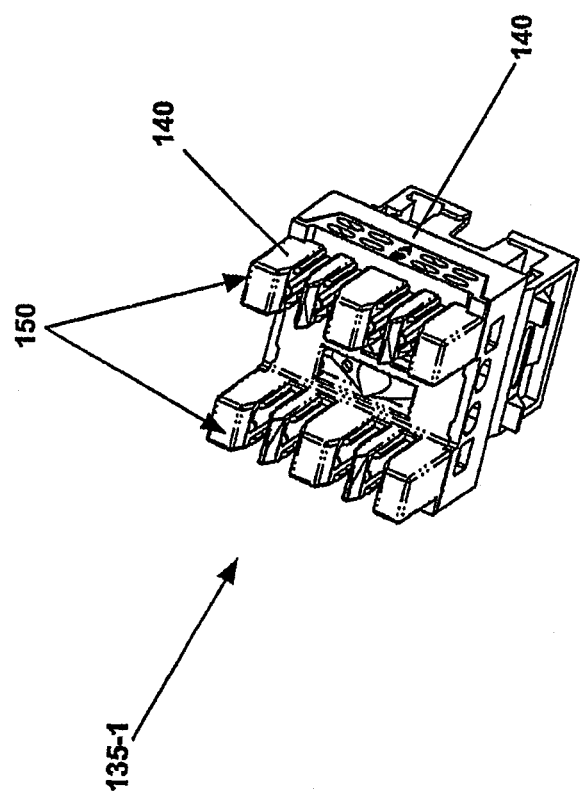
FIG. 15B is another perspective view of the jack of FIG. 15A.

FIG. 15B shows another perspective view of the jack 135-1 of FIG. 15A, including the shield sections 140 located on surfaces of the jack 135-1. The jacks 135-1 can be used in combination with any of the embodiments of the shield structures 120 discussed above to increase the shielding about the jack 135-1.

Figures 16A, 16B:
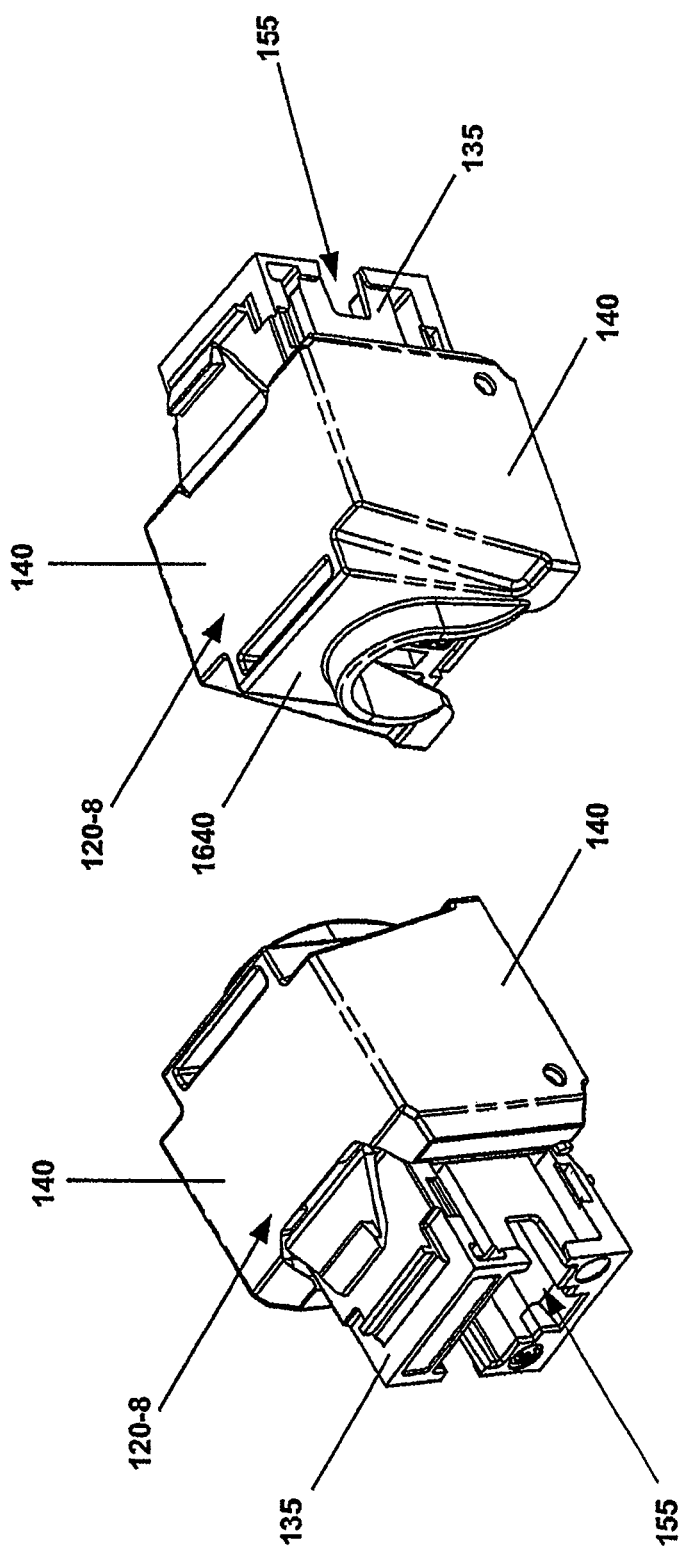
FIG. 16A is a perspective view of a shielded termination cap.
FIG. 16B is another perspective view of the shielded termination cap of FIG. 16A.

FIG. 16A is a perspective view of another embodiment of the shield structure 120. As shown in FIG. 16A, a shield structure 120-8 can comprise a termination cap configured to fit about the jack 135. The shield structure 120-8 may include a conductive material, such as any conductive material of the shield sections 140, to help reduce alien crosstalk between adjacent jacks 135. Any number of surfaces of the shield structure 120-8 can include the conductive material. Preferably, the lateral sides of the shield structure 120-8 include the conductive material to reduce alien crosstalk between laterally adjacent jacks 135.

FIG. 16B shows another perspective view of the shield structure 120-8 of FIG. 16A. As shown in FIG. 16B, the shield structure 120-8 may also include a shield section 1640 positioned at the back of the jack 135. The shield section 1640 can include any of the characteristics discussed above in relation to the shield section 140. Further, the shield section 1640 may be positioned at the back of the jack 135 and include an orifice for receiving a cable for attachment to the jack 135. When the jacks 135 of a jack assembly include the shield structures 120-8, alien crosstalk is reduced between the adjacent jacks 135.

The shield structure 120-8 can conveniently fit about the jack 135 like any termination cap. This allows the shield structure 120-8 to easily fit the jack 135 that is already deployed in a jack assembly of a data network.

The embodiments discussed above are provided as examples. The invention includes other embodiments of the jack assembly 100 and the shield structure 120 that can be configured to position a shield between the adjacent jacks 135 to reduce alien crosstalk between them. Preferably, the different embodiments of the shield structures 120 are configured to separate each set of adjacent jacks 135.

B. Position Views

Alien crosstalk between jacks 135 can be minimized by selectively positioning the jacks 135 in relation to one another. Adjacent jacks 135 are of particular concern. When the conductors, e.g., the pins, of the adjacent jacks 135 share a generally parallel orientation, they are more prone to the coupling effects of alien crosstalk. Accordingly, alien crosstalk can be reduced by positioning the adjacent jacks 135 such that the conductors of one jack 135 are not parallel to the conductors of an adjacent jack 135. Preferably, the adjacent jacks 135 are moved away from a parallel position by at least a predetermined extent such that the adjacent jacks 135 are far enough away from being parallel that alien crosstalk between the adjacent jacks 135 is effectively reduced. The adjacent jacks 135 can be moved away from being parallel in a wide variety of ways, including positioning or orienting each of the adjacent jacks 135 differently with respect to one another.

Further, alien crosstalk between the jacks 135 can be minimized by selectively positioning the jacks 135 so that they are not aligned with one another. Again, adjacent jacks 135 are of particular concern. When the conductors of a first adjacent jack 135 are aligned with the conductors of a second adjacent jack 135, the adjacent jacks 135 are more prone to the coupling effects of alien crosstalk. Accordingly, alien crosstalk can be reduced by positioning the adjacent jacks 135 such that the conductors of one jack 135 are not aligned with the conductors of an adjacent jack 135. Preferably, the adjacent jacks 135 are moved away from an aligned position such that the number of adjacent jacks 135 within a common plane, e.g., an orthogonal plane, is minimized. This helps to reduce alien crosstalk between the adjacent jacks 135. The adjacent jacks 135 can be moved away from being aligned in a wide variety of ways, including staggering, offsetting, and inverting the jacks with respect to one another. Some positional embodiments are described below.

1. Angled Views

FIG. 17 shows a perspective view of an embodiment of a jack assembly 1700 with the jacks 135 positioned at different angles with respect to a surface of the jack assembly 1700. Accordingly, the adjacent jacks 135 are positioned at dissimilar angles with respect to one another. By positioning the adjacent jacks 135 at different angles, the conductors of the adjacent jacks 135 are moved away from becoming parallel, which helps reduce alien crosstalk.

Preferably, the jacks 135 of each set of adjacent jacks 135 should be oriented at angles that differ by at least a predetermined extent. The predetermined extent of position differentiation, e.g., angle differentiation, should move the jacks 135 far enough from being parallel to effectively reduce alien crosstalk between them. In some embodiments, the predetermined extent is no less than approximately eight degrees. In some embodiments, no two of the jacks 135 of the jack assembly 1700 have generally parallel orientations.

The jacks 135 can be positioned at different respective angles in a wide variety of ways. For example, the jack assembly 1700 includes a frame 1710 that can be configured to receive and position the jacks 135 at different angles with respect to a surface of the frame 1710. Further, the jacks 135 can be shaped to allow them to be positioned at different angles.

The dissimilarly angled jacks 135 can further reduce alien crosstalk by moving the cables attached to the jacks 135 away from becoming parallel with respect to one another. When the cables are attached to the adjacent jacks 135, a certain length of each of the attached cables extending away from the jacks 135 tends to become oriented similar to the angles of the jacks 135. Therefore, the positioning of the adjacent jacks 135 at different angles helps move the attached cables away from becoming parallel at least over some cable length extending away from the jack assembly 1700. This is true for both the cables attached to the rear of the jack 135 and the cables or plugs attached to the front socket 155 of the jack 135. By moving a certain length of the attached cables away from becoming parallel, the conductors in adjacent cables are prevented from becoming parallel near the jacks 135. This reduces alien crosstalk between adjacent cables over at least part of their lengths.

2. Staggered Views

Figure 18A:
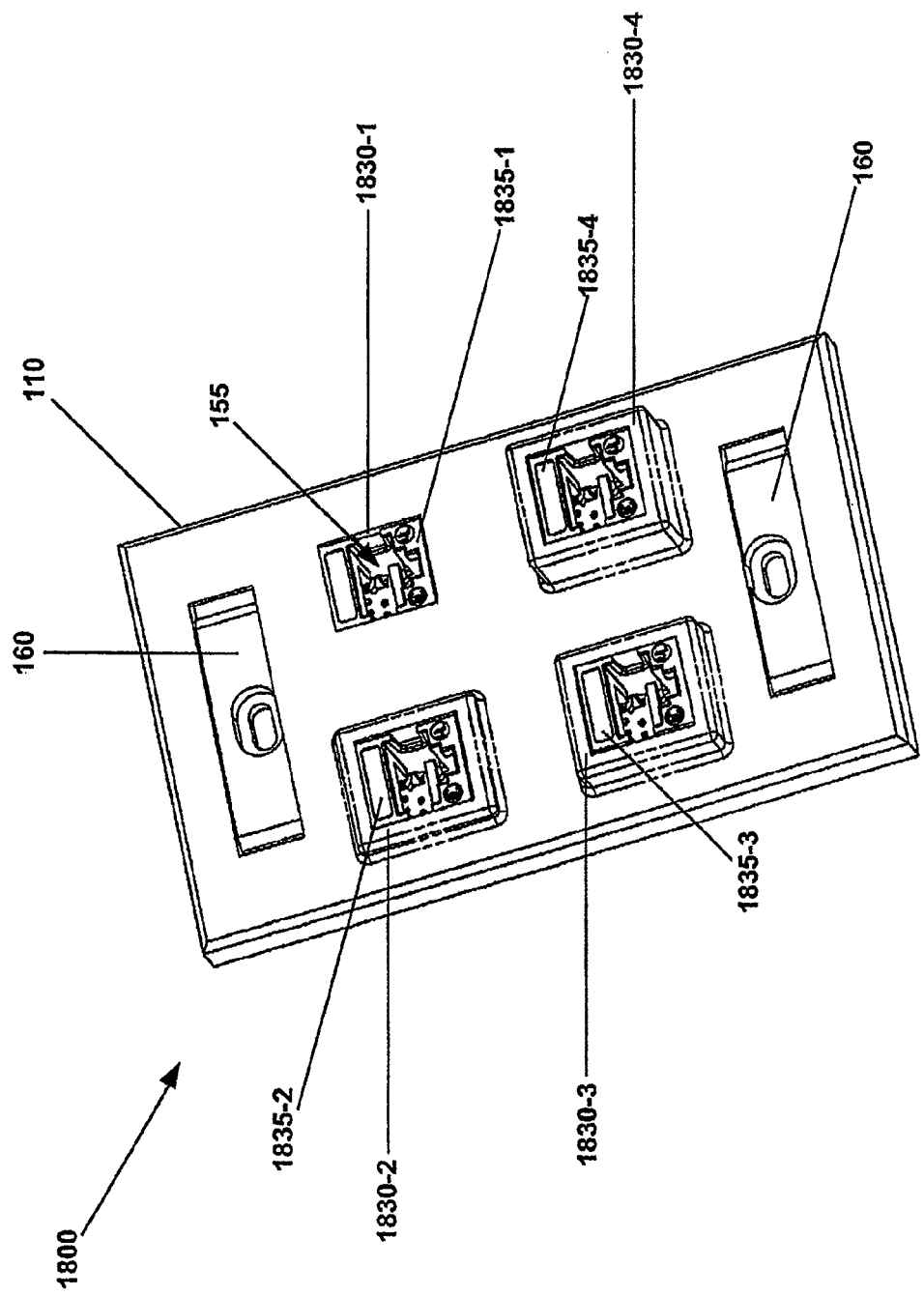
FIG. 18A is a perspective view of an embodiment of a jack assembly with adjacent jacks positioned at different depths with respect to a surface of the jack assembly.

FIG. 18A shows a perspective view of another embodiment of a jack assembly 1800 with jacks 1835-1, 1835-2, 1835-3, 1835-4 (collectively the "jacks 1835") positioned at different depths with respect to a surface of the jack assembly 1800, such as the front surface. The jacks 1835 include the features discussed above in relation to the jacks 135. Further, the jacks 1835 are positioned at staggered depths with respect to one another. This configuration of the jack assembly 1800 helps minimize alien crosstalk between the adjacent jacks 1835 by moving the conductors of the jacks 1835 such that they are not aligned with respect to each other. Further, the resultant increase in distance between the staggered conductors of the adjacent jacks 1835 helps reduce alien crosstalk between the adjacent jacks 1835. Accordingly, the staggered depths of adjacent jacks 1835 help reduce alien crosstalk between the adjacent jacks 1835.

The jacks 1835 can be positioned at different respective depths in a wide variety of ways. For example, the jack assembly 1800 includes the frame 110. A number of jack mounts 1830 can be coupled to the frame. As shown in FIG. 18A, the jack mounts 1830 can extend at different lengths away from the frame 110 to receive the jacks 1835 at staggered depths in relation to a surface of the frame 110. In FIG. 18A, the jack assembly 1800 includes a number of jacks 1835 received by the jack mounts 1830-1, 1830-2, 1830-3, 1830-4 (collectively "the jack mounts 1830"), which are distinguished by their dissimilar depths. The jack mounts 1830 can extend at any direction away from the frame 110, including a generally forward direction and a generally rearward direction. Preferably, the jack mounts 1830 are differentiated such that adjacent jacks 1835 are staggered by at least approximately the predetermined distance.

FIG. 18B is a side view of conductors of the jacks 1835 of FIG. 18A. As shown in FIG. 18B, the conductors of the jacks 1835 can include mating pins 1840 connected to insulated displacement contacts 1850 (hereinafter "IDC's 1850") by a circuit board 1860. In FIG. 18B, the jacks 1835 are staggered with respect to one another. The jack 1835-1 is positioned such that its circuit board 1860 is within a first lateral plane (LL-1). The circuit board 1860 of the jacks 1835-2 is positioned along a second lateral plane (LL-2) that is not within the first lateral plane (LL-1). Similarly, the circuit boards 1860 of the jacks 1835-3, 1835-4 are positioned along other unique lateral planes (LL-3, LL-4) that are not within the first lateral plane (LL-1). Preferably, none of the jacks 1835 of the jack assembly 1800 shares a common lateral plane with an adjacent jack 1835. In some embodiments, the jacks 1835 of the jack assembly 1800 are staggered such that no more than two jacks 1835 are co-planar.

By staggering the adjacent jacks 1835 at different depths in relation to one another, the mating pins 1840, the circuit boards 1860, and the IDC's 1850 of the respective jacks 1835 are moved away from being laterally aligned with each other. For example, FIG. 18B shows that the IDC's 1850 of the jack 1835-1 are not completely aligned with the IDC's 1850 of the adjacent jack 1835-2. In other words, the IDC's 1850 of the jack 1835-1 are not completely within the orthogonal plane of the IDC's 1850 of the adjacent jack 1835-2. Accordingly, the distance between at least a portion of the IDC's 1850 of the respective jacks 1835 is increased, and alien crosstalk between the IDC's 1850 of the respective jacks 135 is reduced. As discussed further below, the adjacent jacks 1835-1, 1835-2 should be staggered enough to effectively reduce alien crosstalk between them.

FIG. 18C shows a top view of the staggered jacks 1835 of FIG. 18B. In FIG. 18C, a distance (Z) indicates the distance that the adjacent jacks 1835-1, 1835-4 are staggered in relation to one another. For example, the jacks 1835 can be staggered generally forward or backward in relation to an adjacent jack 1835 by the distance (Z). The distance (Z) should be at least approximately a predetermined distance such that the conductors of the adjacent jacks 135 are staggered far enough from alignment to reduce alien crosstalk. Although it is preferable to stagger the adjacent jacks 1835 enough to remove their IDC's from overlapping in a common plane, as mentioned above, a partial overlap of the conductors of adjacent jacks 135 can still function to reduce alien crosstalk because the conductors are no longer completely within a common plane. By moving even a partial length of the conductors of a particular jack 1835 out of alignment with at least a portion the conductors of an adjacent jack 1835, alien crosstalk is reduced between the conductors of the respective adjacent jacks 1835.

3. Offset Views

FIG. 19A shows a perspective view of another embodiment of a jack assembly 1900. The jack assembly 1900 comprises a frame 1910 configured to receive jacks 1935 offset with respect to one another. The jacks 1935-1, 1935-2, 1935-3, 1935-4 (collectively the "jacks 1935") include all the features discussed above in relation to the jacks 135. Further, the jacks 1935 can be offset from one another. An offset configuration of the jacks 1935 of the jack assembly 1900 helps minimize alien crosstalk between the adjacent jacks 1935 by moving the conductors of the jacks 1935 away from alignment and by increasing the distances between the respective conductors of the adjacent jacks 1935. In particular, the distance can be increased by positioning the jacks 1935 away from an orthogonal alignment. For example, the jack 1935-1 can be offset so that the adjacent jack 1935-2 is not directly above, below, or to the side of the jack 1935-1.

By offsetting the jacks 1935 from each other, the conductors of the respective jacks 1935 are offset. FIG. 19B shows a side view of the conductors of the jacks 1935 of the jack assembly 1900 of FIG. 19A. Each of the jacks 1935 include the mating pins 1840 and the IDC's 1850 connected by the circuit board 1860. As shown in FIG. 19B, the jacks 1935 are positioned along different horizontal planes: jack 1935-1 is positioned at horizontal plane (HH-1); jack 1935-2 is positioned at horizontal plane (HH-2); jack 1935-3 is positioned at horizontal plane (HH-3); and jack 1935-4 is positioned at horizontal plane (HH-4). For purposes of illustration, the horizontal planes HH-1, HH-2, HH-3, and HH-4 (collectively the "horizontal planes (HH)") are shown to intersect the approximate center points of the individual jacks 1935. This offset configuration reduces alien crosstalk by distancing the conductors of the jacks 1935 farther apart than in a non-offset configuration.

To offset the jacks 1935 from one another, at least a subset of the jacks 1935 shown in FIG. 19B have been vertically offset such that the jacks 1935 do not share common horizontal planes. For example, the jack 1935-1 and/or the jack 1935-2 have been shifted vertically to form a distance (Y-1) between the horizontal plane (HH-1) and the horizontal plane (HH-2).

FIG. 19C shows a front view of the jacks 1935 of the jack assembly 1900. Similar to FIG. 19B, FIG. 19C shows the distance of offset between the jack 1935-1 and the jack 1935-2, as well as jacks 1935 positioned at the different horizontal planes (HH). FIG. 19C also shows a distance (X-1) that represents a generally horizontal distance between the jack 1935-1 and the jack 1935-2.

The distance between the offset jacks 1935 of the jack assembly 1900 can be easily determined using the vertical and horizontal offset distances between the jacks 1935. For example, the distance (X-1) and the distance (Y-1) between the jacks 1935-1, 1935-2 can be measured or otherwise determined. From the distances (X-1, Y-1), an angle (A-1) between the horizontal plane (H-2) of the jack 1935-2 and a line (MM) intersecting the two jacks 1935-1, 1935-2 at their approximate center points can be easily determined. Any of these determined characteristics can be easily used to determine the distance of the line (MM) between the center points of the jacks 1935-1, 1935-2. It is well-known that the line (MM) is a greater distance than either of the distances (X-1, Y-1). Accordingly, the distance (MM) between the jacks 1935-1, 1935-2 is increased by offsetting the same jacks 1935-1, 1935-2 such that they do not share common horizontal or vertical planes. The same operations can be used to determine angles and distances between other adjacent jacks 1935, such as an angle (A-2) related to the jacks 1935-2, 1935-3. Similar operations can be used to determine that the distance between the offset jacks 1935 has been increased enough to reduce alien crosstalk.

The adjacent jacks 1935 should be offset by at least a predetermined distance such that alien crosstalk between the adjacent jacks 1935 is effectively reduced. While the goal is to maximize the extent of the line (MM), in one preferred embodiment the starting point is to establish a minimum predetermined distance component that is no less than approximately one-half the height (H) of the jack 1935. By being offset at least by a component of one-half the height (H), the conductors of the adjacent jacks 1935 are moved far enough out of the common horizontal plane (HH) to effectively help minimize alien crosstalk between the adjacent jacks 1935.

In some embodiments, the height (H) of the jack 1935 is approximately 0.6 inches (15.24 mm). Accordingly, the predetermined distance is at least approximately 0.3 inches (7.62 mm). Thus, for example, Y-1 would be approximately 0.3 inches (7.62 mm).

While it would be desirable to have a maximum horizontal displacement as well, in practice, a minimum horizontal displacement is at least approximately 2 inches (50.8 mm). Thus, for example, the distance (X-1) would be 2 inches (50.8 mm). Based on the distance (X-1) being approximately 2 inches (50.8 mm) and the distances (Y-1) being approximately 0.3 inches (7.62 mm), the angle (A-1) between adjacent jacks 1935 should be at least approximately 8.5 degrees and the extent of line (MM) should be approximately 2.02 inches (51.31 mm) to help minimize alien crosstalk effectively. The offset distance (MM) and the angle (A-1) should be at least approximately predetermined values that function to effectively reduce alien crosstalk.

Figure 19D:
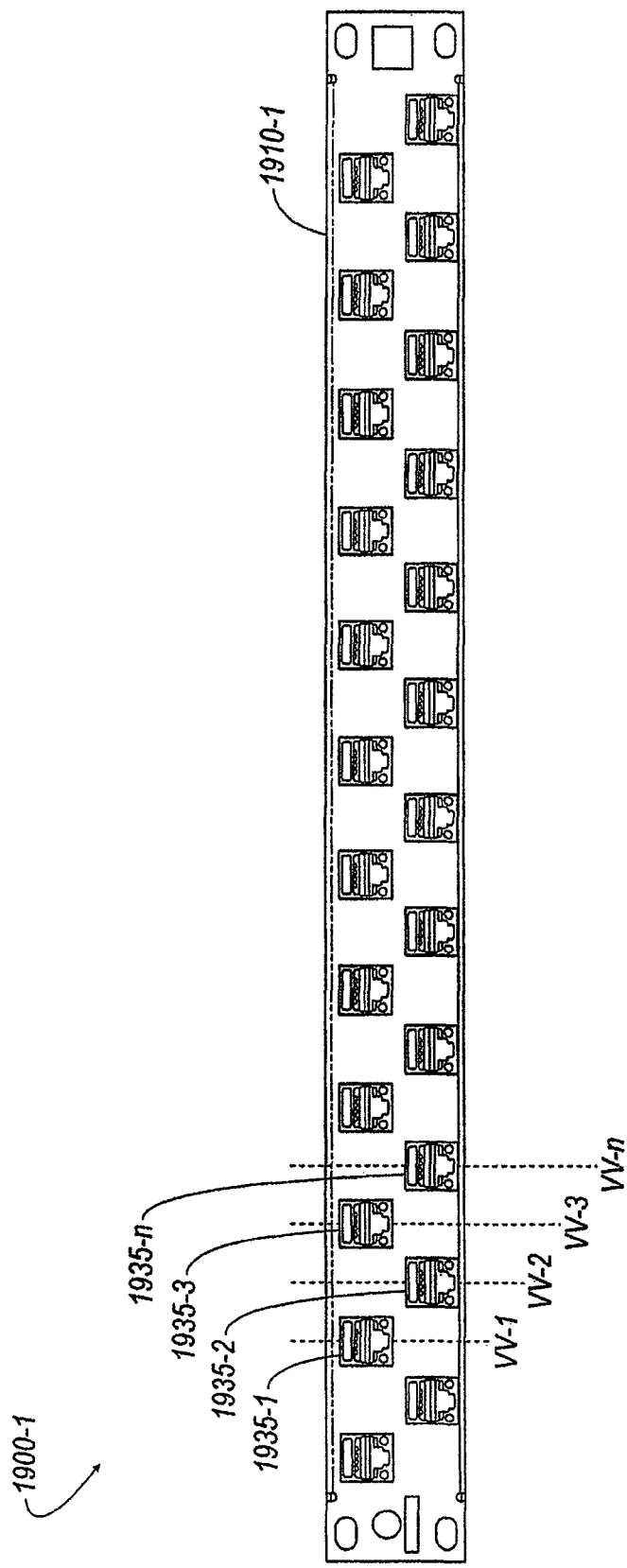
FIG. 19D is a front view of another embodiment of the jack assembly of FIG. 19A.

The jack assembly 1900 can be configured for offsetting the adjacent jacks 1935 in a number of different ways. As shown in FIG. 19C, at least a subset of the jacks 1935 can be offset in a generally vertical direction. Although not shown in FIG. 19C, at least a subset of the jacks 1935 can be offset in a generally horizontal direction. Similarly, at least a subset of the jacks 1935 may be offset in any combination of generally vertical and generally horizontal directions. An example of horizontally shifted jacks 1935 is illustrated by FIG. 19D.

Because the offset distance (MM) can be a function of both the vertical displacement (X-1) and the horizontal displacement (Y-1), a change to the distances (X-1, Y-1) also adjusts the effects of alien crosstalk. Specifically, the distance (MM) can be increased to improve isolation from alien crosstalk by increasing the distance (Y-1) and/or the distance (X-1). Similarly, the angle (A-1) also affects the isolation against alien crosstalk. For example, if the angle (A-1) is increased up to a certain threshold, e.g., 45 degrees, then the distance (X-1) and/or the distance (Y-1) can be decreased while still maintaining an adequate offset distance and angle for reducing alien crosstalk. On the other hand, if the angle (A-1) is decreased up to some threshold, then the offset distance (MM) should be increased to still effectively reduce alien crosstalk.

FIG. 19D shows another embodiment of the jack assembly 1900 of FIG. 19A. FIG. 19D shows a jack assembly 1900-1 that includes a number of the jacks 1935 received by a frame 1910-1. The frame 1910-1 can be configured for use with any size of panel, including a 24-jack patch panel. The jacks 1935 are horizontally offset such that they do not share a common vertical plane. For example, the jack 1935-1 is positioned along vertical plane (VV-1), the jack 1935-2 is positioned along vertical plane (VV-2), the jack 1935-3 is positioned at vertical plane (VV-3), and so on for "n" number of the jacks 1935. As shown, the jacks 1935 can be offset such that none of the jacks 1935 of the jack assembly 1900-1 shares a common vertical plane.

In the jack assembly 1900-1 of FIG. 19D, the vertical displacement (Y-1) is approximately the entire height of the jack 1935 as opposed to one half the height of the jack 1935. If the distance between the vertical planes (VV) is kept the same as the horizontal displacement (X-1) shown in FIG. 19C, the offset distance (MM) is increased because of the increased vertical displacement (Y-1) between the jacks 1935. For example, if the distance (X-1) is approximately 2 inches (50.8 mm) as discussed above in relation to FIG. 19C, while the distance (Y-1) is increased from approximately 0.3 inches (7.62 mm) to approximately 0.6 inches (15.24 mm), then the offset distance (MM) is increased to approximately 2.09 inches (53.09 mm). Thus, the alien crosstalk is reduced even further.

The discussion above relating to the vertical offset configurations of FIGS. 19A-C also applies to the horizontally offset configuration shown in FIG. 19D. Further, any combination of vertical and horizontal offsets can be used to offset the jacks 1935. Preferably, the jacks 1935 of the jack assembly 1900 are arranged such that none of the jacks 1935 shares a vertical or a horizontal plane with an adjacent jack 1935. In some embodiments, the jacks 1935 of the jack assembly 1900 are offset such that no more than two jacks 1935 share a common orthogonal plane.

Preferably, the number of adjacent jacks 1935 within a common plane should be minimized. For example, the jacks 1935 can be offset such that any common plane includes no more than two jacks 1935. In many embodiments, adjacent jacks 1935 comprise any jacks 1935 within approximately two inches (50.8 mm) of one another.

Figure 19E:
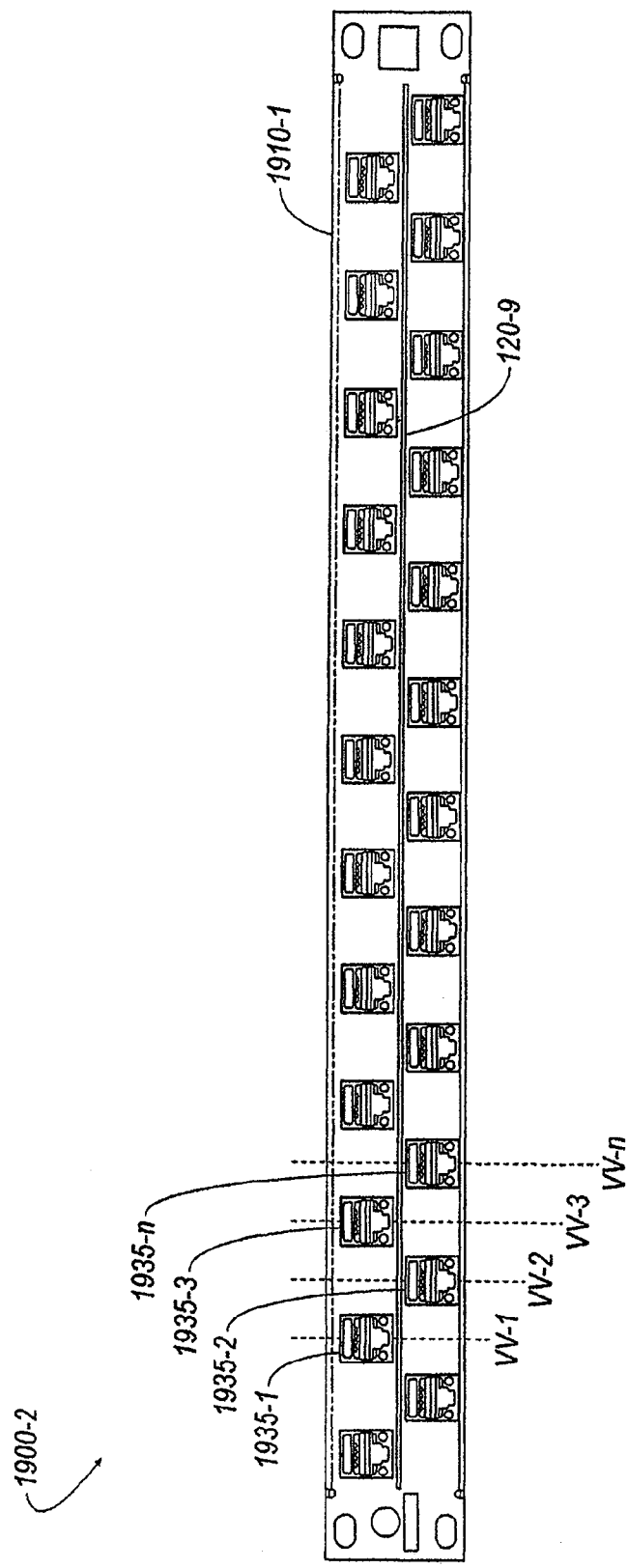
FIG. 19E is a front view of another embodiment of the jack assembly of FIG. 19D.

FIG. 19E is a perspective view of another embodiment of the jack assembly 1900-1 of FIG. 19D. As shown in FIG. 19E, the jack assembly 1900-2 can include the features of the jack assembly 1900-1. Further, the jack assembly 1900-2 may include a shield structure 120-9. The shield structure 120-9 includes the features discussed above in relation to the shield structure 120. The shield structure 120-9 can be positioned between subsets of the jacks 1935. For example, the shield structure 120-9 separates a first row of jacks 1935 from a second row of jacks 1935.

The jack assembly 1900-2 may include the shield structure 120-9 to help reduce alien crosstalk. In particular, if any of the jacks 1935 are offset from each other by less than approximately the predetermined distance, the shield structure 120-9 can be configured to separate the same jacks 1935. Alternatively, where the offset is at least approximately the predetermined distance, the shield structure 120-9 may be omitted as shown in FIG. 19D. Further, many of the shield structures discussed above can be used with the jack assembly 1900-2 to help reduce alien crosstalk if an offset is less than the predetermined distance.

The jacks 1935 can be offset by various horizontal and vertical distances providing a minimum acceptable distance (MM) and minimum acceptable angle (A-1). As noted above, it is not enough that distance (MM) be a certain extent; the existence of angle (A-1) helps to prevent undesirable planar alignment between adjacent jacks. For example, the jack 1935-2 can be offset from the jack 1935-1 by a first vertical distance and a second horizontal distance. The jack 1935-2 can be offset from the jack 1935-3 by a third horizontal distance and a fourth vertical distance. By varying the offset distances between the jacks 1935, patterns can be avoided that may tend to align jacks 1935 while still providing an overall acceptable distance (MM) and angle (A-1) between them. This is especially helpful for jack assemblies having numerous jacks 1935.

4. Inverted Views

Figure 20A:
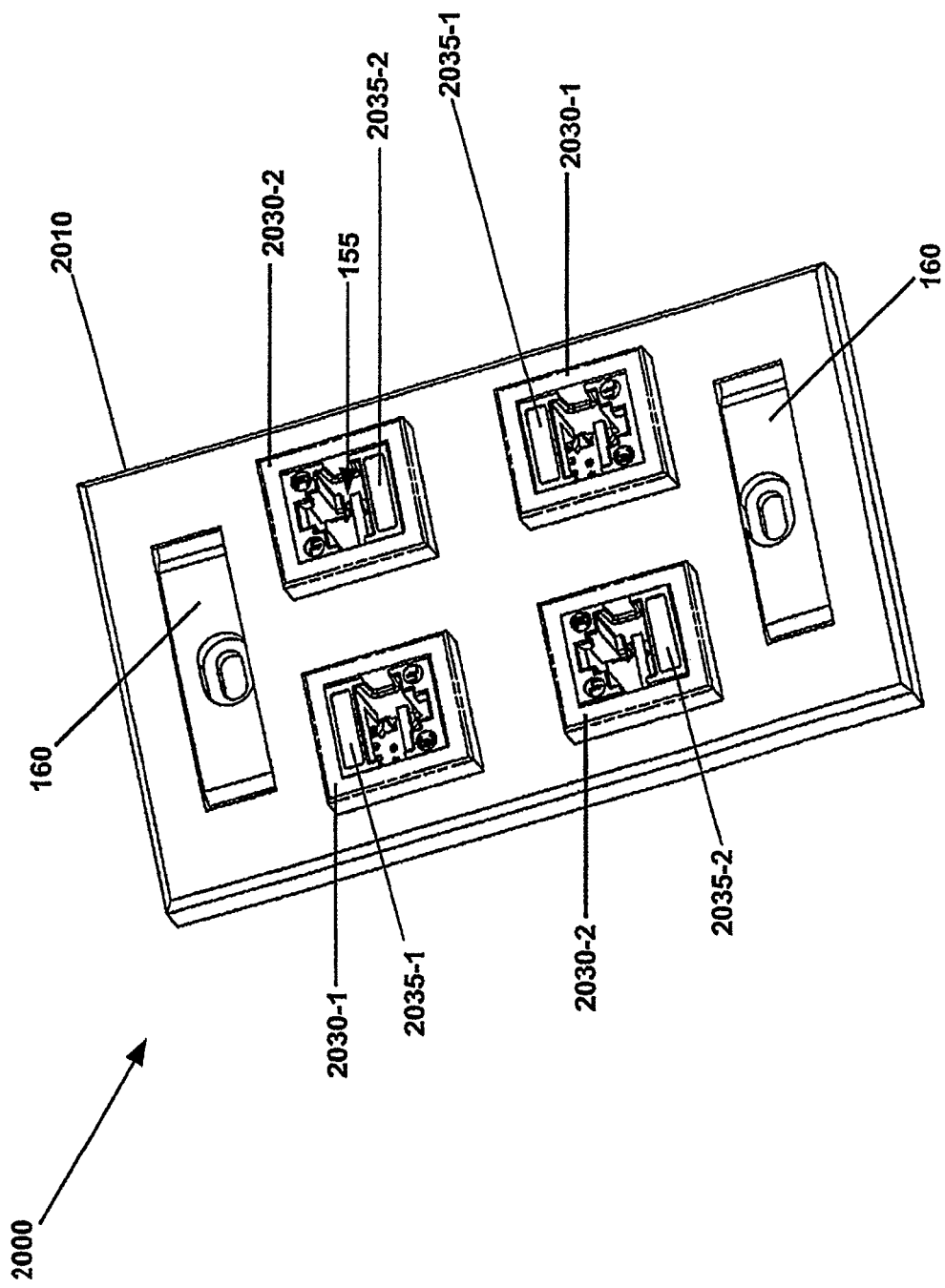
FIG. 20A is a perspective view of an embodiment of a jack assembly with adjacent jacks inverted with respect to one another.

FIG. 20A shows a perspective view of another embodiment of a jack assembly 2000 with adjacent jacks 2035-1, 2035-2, 2035-3, 2035-4 (collectively the "jacks 2035") inverted with respect to one another. This configuration of the jack assembly 2000 helps minimize alien crosstalk between the adjacent jacks 2035 by positioning the adjacent jacks 2035 away from alignment with one another. Specifically, one of the jacks 2035 of a pair of adjacent jacks 2035 can be inverted so that its mating pins 1840 (not shown; see FIG. 20B) are not positioned within a horizontal plane of the mating pins 1840 of the other adjacent jack 2035. This increases the distance between the mating pins 1840 of the respective adjacent jacks 2035 and minimizes the alien crosstalk between them.

The jack assembly 2000 can be configured to invert the adjacent jacks 2035 in a number of different ways. For example, laterally adjacent jacks 2035 can be inverted with respect to one another. Further, longitudinally adjacent jacks 2035 can be inverted with respect to one another. To facilitate inverting adjacent jacks 2035 with respect to one another, a frame 2010 of the jack assembly 2000 may be configured to receive some of the jacks 2035 in inverted positions. Alternatively, the frame 2010 can be configured to receive a number of jack mounts 2030 that are configured to receive the jacks 2035. The jack mounts 2030 can include upright jack mounts 2030-1 and inverted jack mounts 2030-2. As shown in FIG. 20A, the inverted jack mounts 2030-2 can be positioned adjacent to the upright jack mounts 2030-1 such that when the jacks 2035 are received, the jacks 2035 of each pair of adjacent jacks 2035 is inverted with respect to each other.

FIG. 20B shows a side view of conductors of the jacks 2035 of the jack assembly 2000. The jacks 2035 may include any of the features discussed above in relation to the jacks 135. As shown in FIG. 20B, the mating pins 1840 of upright jacks 2035-1 are positioned in different horizontal planes than are mating pins 1840-1 of inverted jacks 2035-2. Specifically, the mating pins 1840 of the jack 2035-1 are positioned at the horizontal plane (HH-5), the mating pins 1840-1 of the jack 2035-2 are positioned at the horizontal plane (HH-6), the mating pins 1840 of the jack 2035-3 are positioned at the horizontal plane (HH-7), and the mating pins 1840-1 of the jack 2035-4 are positioned at the horizontal plane (HH-8). FIG. 20C is a front view of the conductors of the jacks 2035 of FIG. 20B that further illustrates the unique horizontal planes (HH-5, HH-6, HH-7, HH-8) of the mating pins 1840, 1840-1 of the jacks 2035. This configuration helps minimize alien crosstalk between the mating pins (1840, 1840-1) of the adjacent jacks 2035.

Figure 20D:
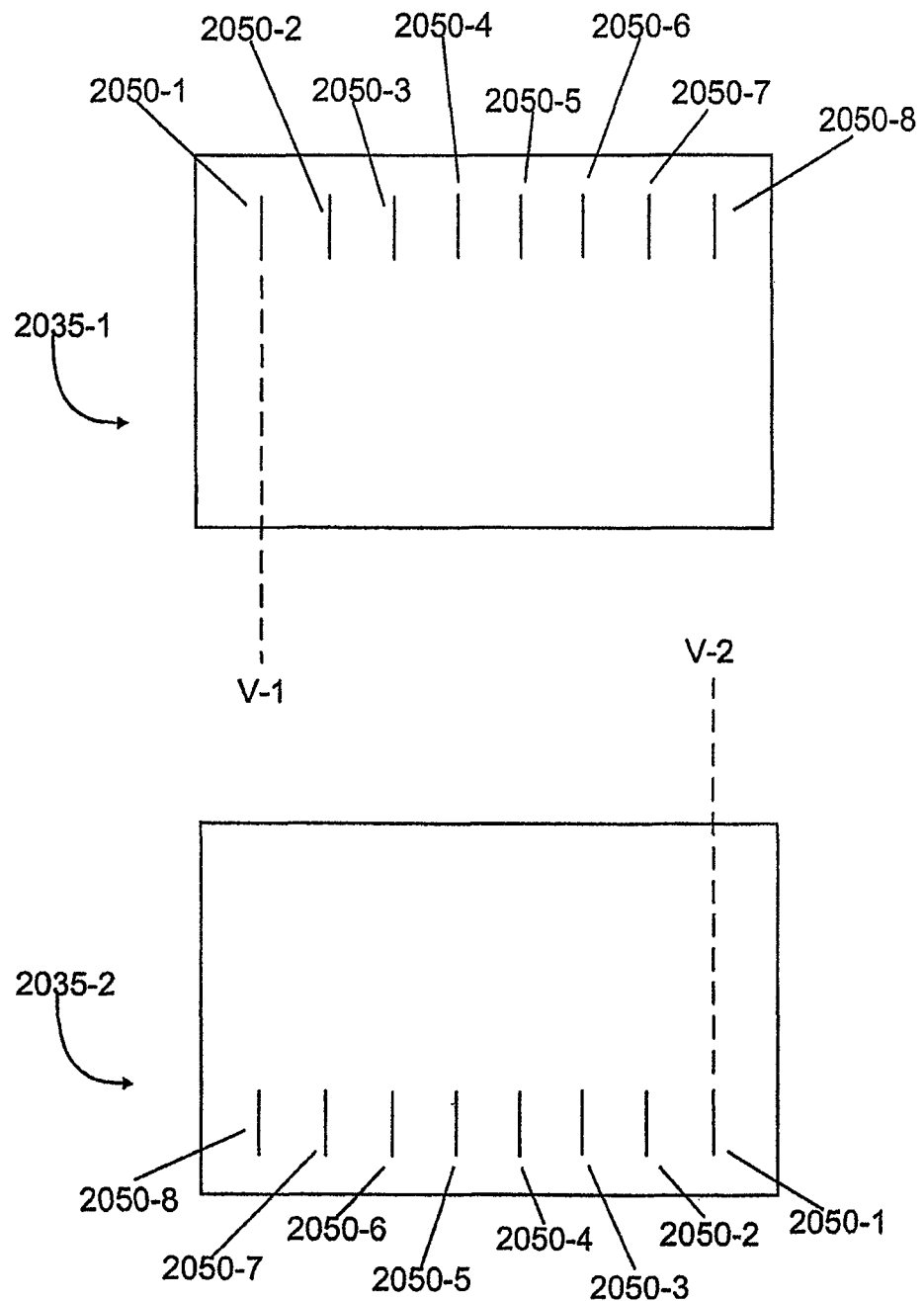
FIG. 20D is a front view of pins of vertically arranged jacks, where one of the jacks is inverted.

Further, the inverted relationship of the adjacent jacks 2035 can position the mating pins 1840, 1840-1 of vertically adjacent jacks 2035, e.g., the jacks 2035-1, 2035-2, out of vertical alignment to reduce alien crosstalk. Specifically, the mating pins 1840-1 of the inverted jacks 2035-2 are reversed from the corresponding mating pins 1840 of the upright jacks 2035-1. FIG. 20D shows the relationship of the upright mating pins 1840 and the inverted mating pins 1840-1 of the vertically adjacent jacks 2035-1, 2035-2. As shown in FIG. 20D, each of the jacks 2035-1, 2035-2 includes pins 2050-1, 2050-2, 2050-3, 2050-4, 2050-5, 2050-6, 2050-7, 2050-8 (collectively the "pins 2050") arranged for compatibility with complimentary plugs. When an upright jack 2035-1 is inverted, the arrangement of the pins 2050 is also inverted. Accordingly, when the adjacent jacks 2035-1, 2035-2 are positioned generally vertical to one another, the pins 2050 of the upright jack 2035-1 are not aligned with the pins 2050 of the inverted jack 2035-2. For example, the pin 2050-1 of the upright jack 2035-1 is not in the same vertical plane (V-1) as the pin 2050-1 of the inverted jack 2035-2, which is in vertical plane (V-2). This helps to reduce alien crosstalk by distancing the corresponding pins 2050 of the jacks 2035-1, 2035-2 apart.

III. Compensation Views

Connectors may be configured to compensate for alien crosstalk by adjusting the data signals being transmitted through the connectors. In particular, the effects of alien crosstalk on a connector's signal can be determined, and the connector can be configured to adjust its signal to compensate for the alien crosstalk effects. Many methods and mechanisms are known for adjusting data signals to compensate for intra-connector crosstalk between the pins of a connector. However, as discussed above, intra-connector methods are not used to compensate for alien crosstalk.

Techniques for determining and compensating for alien crosstalk between connectors are discussed below. In particular, the effects of alien crosstalk on a victim signal can be determined. From this determination, signal compensators can be provided to adjust the victim signal to compensate for the determined alien crosstalk effects.

A. Alien Crosstalk Determination Techniques

FIG. 21 is a block diagram of an embodiment of a jack assembly 2100 that may be used with a test assembly to determine the effects of alien crosstalk between connectors. As discussed above, when the connectors are transmitting data signals, each connector of the jack assembly 2100 can be affected by alien crosstalk from adjacent connectors. Therefore, to determine the effects of alien crosstalk on each connector, a test assembly can be used to generate transmission signals through a first connector and measure the effects of coupled signals on an adjacent connector. The jack assembly 2100 is shown for illustrative purposes. Many other connector configurations can be used with the test assembly to determine the effects of alien crosstalk.

As FIG. 21 shows, the jack assembly 2100 can include a victim jack 2110 positioned adjacent to a number of disturber jacks 2120-1, 2120-2, 2120-3, 2120-4, 2120-5, 2120-6, 2120-7, 2120-8 (collectively "the disturber jacks 2120"). The victim jack 2110 and the disturber jacks 2120 share the same features discussed above in relation to the jack 135. Different methods and techniques can be used to determine the alien crosstalk effects that each transmitting disturber jack 2120 induces on the victim jack 2110. One such embodiment is discussed below in relation to FIG. 22.

It will be appreciated by one of skill in the art that any of the jacks 2110, 2120 of FIG. 21 can be the victim jack 2110 with the other jacks 2120 being the disturber jacks 2120. Accordingly, alien crosstalk effects can be determined for each of the jacks 2110, 2120 of the jack assembly 2100.

Figure 22:
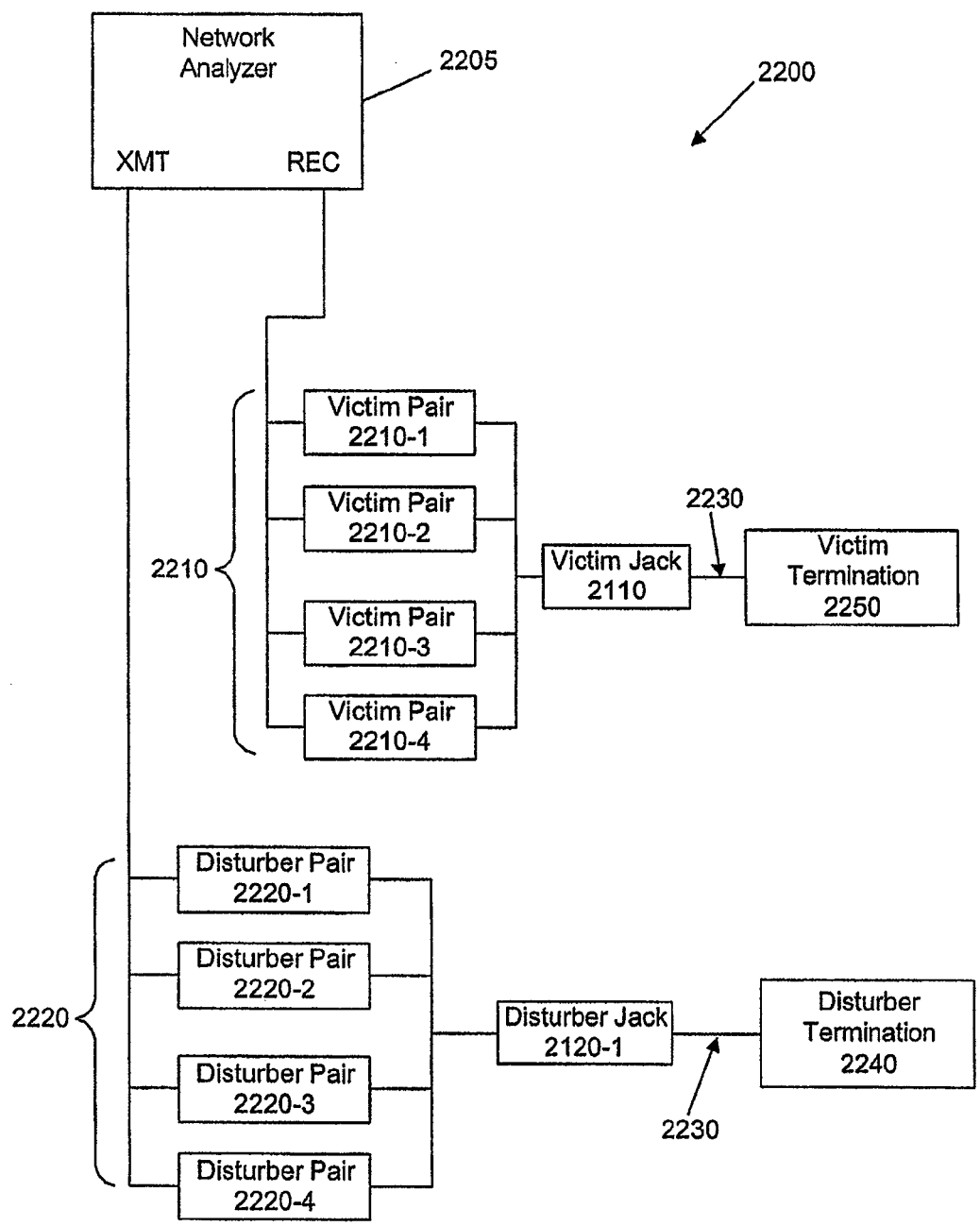
FIG. 22 is a block diagram of a test assembly for determining alien crosstalk between adjacent jacks.

FIG. 22 is a block diagram of an exemplary test assembly 2200 useful for determining the effects of alien crosstalk on the victim jack 2110. In general, the test assembly 2200 can be used to measure the alien crosstalk effects that each disturber jack 2120 induces on the victim jack 2110. Preferably, the test assembly 2200 determines the effects of alien crosstalk generated by each disturber jack 2120 in turn. As shown in FIG. 22, the test setup 2200 includes a network analyzer 2205 having a transmitter coupled to disturber pairs 2220 of one of the disturber jacks 2120, such as the disturber jack 2120-1. The network analyzer 2205 further includes a receiver coupled to victim pairs 2210 of the victim jack 2110. The disturber jack 2120-1 is coupled to a disturber termination 2240 by a cable 2230. The victim jack 2110 is coupled to a victim termination 2250 by a separate cable 2230.

Preferably, the test assembly 2200 simulates at least a part of a data network. Accordingly, the disturber termination 2240 and the victim termination 2250 can include properties that are characteristic of a data network. For example, the disturber termination 2240 and the victim termination 2250 may include resistors having appropriate properties for simulating a network. The cable 2230 can comprise a network-type cable that tends to help simulate a network connection.

In an exemplary process for determining the effects of alien crosstalk generated by the disturber jack 2120-1, the network analyzer 2205 can transmit a test signal to a disturber pair 2220-1 of the disturber jack 2120-1. Preferably, a swept frequency is transmitted to the disturber pair 2220-1. When the transmitted signal travels along the disturber pair 2220-1 of the disturber jack 2120-1, a coupling signal may couple from the disturber pair 2220-1 to any of the victim pairs 2210 of the victim jack 2110. The coupling signal is representative of alien crosstalk induced on the victim pairs 2210.

The coupling signals, i.e. alien crosstalk, can be measured, preferably in turn, on the victim pair 2210-1, victim pair 2210-2, victim pair 2210-3, and victim pair 2210-4. Specifically, the network analyzer 2205 can be used to measure the coupling signals associated with each victim pair 2210. Each measured signal can then be used to determine the effects of alien crosstalk that the transmitted signal induced on the victim pairs 2210.

The network analyzer 2205 can then transmit the signal along a different disturber pair 2220-2. As discussed above, the transmitted signal generates coupling signals at the victim jack 2110. Again, the coupling signals can be measured on the victim pair 2210-1, the victim pair 2210-2, the victim pair 2210-3, and the victim pair 2210-4. With this iteration, the measurements can be used to determine the effects of alien crosstalk that the transmitted signal on the disturber pair 2220-2 induced on the victim pairs 2210. This process can be repeated for the disturber pair 2220-3 and again for the disturber pair 2220-4.

The measurements from the iterations can be aggregated to determine a sum alien crosstalk effect for each individual victim pair 2210. For example, the measurements on victim pair 2210-1 can be aggregated and used to determine a sum alien crosstalk effect that the disturber pairs 2220 of the disturber jack 2120-1 aggregately induced on the victim pair 2210-1. The same holds true for each of the victim pairs 2210 of the victim jack 2110. Alternatively, the network analyzer 2205 may transmit the signal to all of the disturber pairs 2220 simultaneously, and the sum alien crosstalk effects from the disturber pairs 2220 can be measured for each of the victim pairs 2120.

The process described above for determining the sum alien crosstalk effect that the disturber jack 2120-1 has on the individual victim pairs 2210 of the victim jack 2110 can be repeated for the other disturber jacks 2120-2, 2120-3, 2120-4, 2120-5, 2120-6, 2120-7, 2120-8. For example, the transmitter of the network analyzer 2205 can be coupled to different disturber jack 2120-2 and the process repeated. Preferably, the process is repeated for each of the disturber jacks 2120 of the jack assembly 2100. Once the process has been repeated and the sum alien crosstalk effect from each disturber jack 2120 measured, the sum alien crosstalk effects can be aggregated to determine a total alien crosstalk effect on each victim pair 2210 of the victim jack 2110. The total alien crosstalk effect represents how much each victim pair 2210 should be adjusted to compensate for the alien crosstalk effects induced by the disturber jacks 2120. Techniques for applying signal compensators to the pairs of the jacks 2110, 2220 are discussed below.

The process described above can be varied so long as it still accurately measures the effects of alien crosstalk between the jacks 2110, 2120. For example, the process can be performed in a different order than described above. The process may be applied to measure any subset of the disturber pairs 2220 of any subset of the disturber jacks 2220. This allows a connector to be adjusted to compensate for some alien crosstalk without having to compensate for other alien crosstalk. For example, some of the disturber pairs 2220 may generate only a relatively insignificant amount of alien crosstalk on a particular victim pair 2210. Accordingly, the signal compensator for the victim pair 2210 may be configured not to compensate for the alien crosstalk of that particular disturber pair 2220. This allows the jacks 2110, 2120 to be configured for many different connector arrangements and network signals.

Further, the test assembly 2200 can be configured in any way that allows alien crosstalk to be accurately measured. A variety of different measurements may be used to help determine a signal compensator. For example, measurements can be taken of near-end alien crosstalk (ANEXT) and/or far-end alien crosstalk (AFEXT). In the test assembly 2200 of FIG. 22, ANEXT can be measured on the side of the victim jack 2110 nearer to the receiver of the network analyze 2205, while AFEXT may be measured on the victim termination 2250 side of the victim jack 2110. Both of these measurements may be used to help determine an appropriate signal compensator. For example, the ANEXT should be compensated with a signal compensator that does not produce undesirable AFEXT signals.

B. Compensation Techniques

Once the alien crosstalk effect has been determined for a particular victim pair 2210, signal compensators can be provided to compensate for the alien crosstalk effect. The signal compensators should be of magnitudes and phases that effectively compensate for the alien crosstalk effects produced by at least a subset of the disturber pairs 2220 of at least a subset of the disturber jacks 2120. Preferably, the signal compensators are configured to compensate for the sum alien crosstalk effect or the total alien crosstalk effect discussed above.

Figure 23:
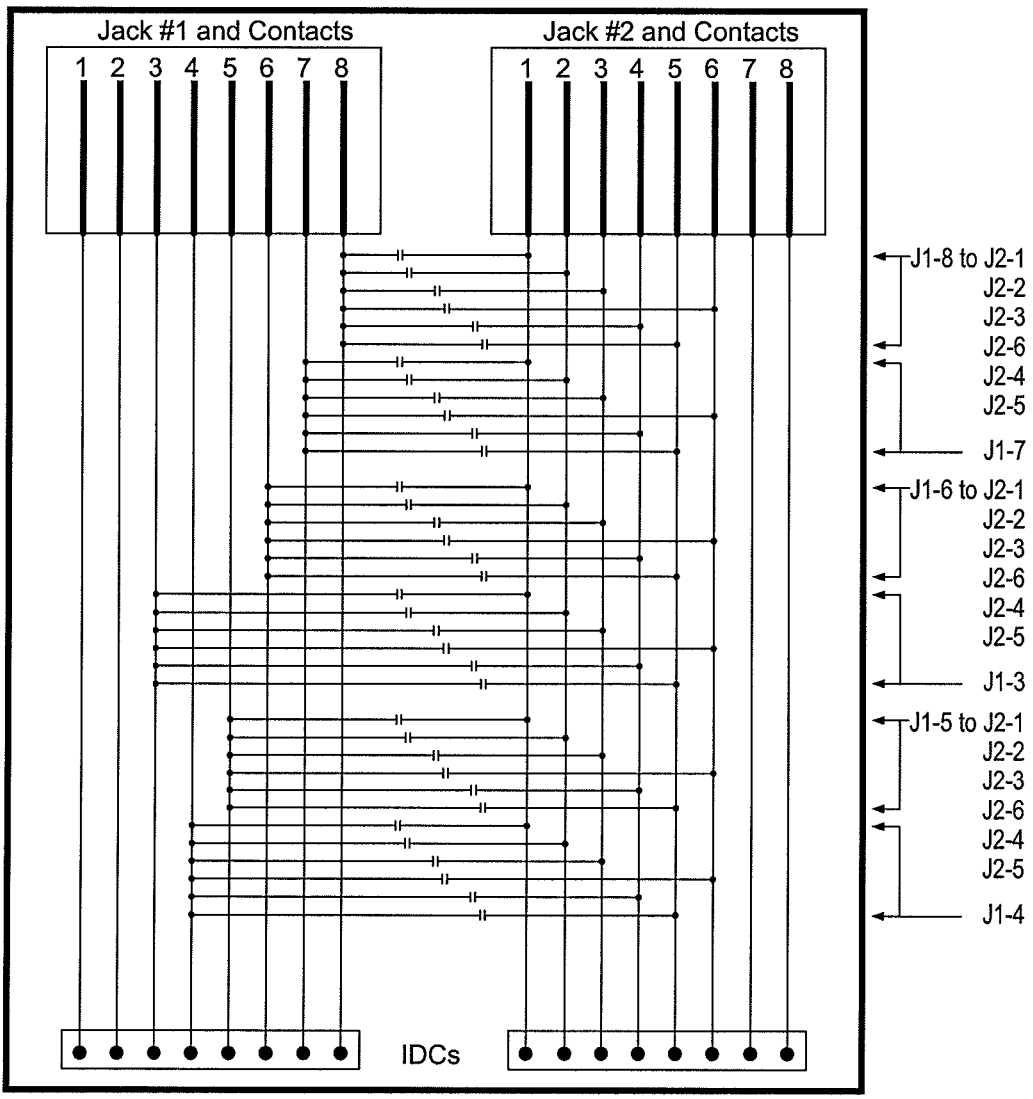
FIG. 23 illustrates an example signal compensation scheme for compensating for alien crosstalk between two adjacent jacks.

A variety of techniques can be used to generate any number of signal compensators for the particular pair 2210. For example, the jack assembly 100-6 of FIG. 12 includes the circuit board 1210 having a number of compensation mechanisms 1220. The compensation mechanisms 1220 can be configured to generate the signal compensators for each pair of the jacks 135. Specifically, the compensation mechanisms 1220 can include conductive elements shaped and positioned to generate specific signal compensators. For example, the conductive elements can be positioned to use other signals traveling through the circuit board 1210 to produce desired coupling effects that generate the signal compensators. The coupling effects can include inductive and/or capacitive coupling. An example signal compensation scheme for compensating for alien crosstalk between two adjacent jacks is shown in FIG. 23. The schematic illustrated in FIG. 23 shows some of the possible capacitive coupling that can be used between two adjacent jacks, such as, for example, a victim jack 2210 and a disturber jack 2220. The conductors of one jack are coupled to the conductors of an adjacent jack with a capacitive element located thereinbetween to compensate for the alien crosstalk between the two jacks. Since each jack has eight mating pin/insulation displacement contact pairs, there are sixty-four possible configurations of capacitive coupling between the two adjacent jacks. In FIG. 23, only thirty-six of the configurations are illustrated. It should be noted that not all the combinations need to be used and only those conductor pairs that do not meet the transmission requirements for alien crosstalk should be compensated.

It is also preferable to position the signal compensators between the two adjacent jacks in such a way that the capacitive or the inductive coupling itself does not lead to additional crosstalk between the adjacent jacks or internally in one jack. Other techniques discussed above such as appropriate shielding or space-maximizing through offsetting or staggering of the jacks can also be used in combination with the capacitive or inductive coupling to minimize alien crosstalk.

The signal compensators may be configured to compensate for the alien crosstalk from any number of disturber pairs 2220, including a single disturber pair 2220. Accordingly, many signal compensators can be used with a single victim pair 2210 to compensate for multiple sources of alien crosstalk. Preferably, each signal compensator is configured to utilize a signal from the associated disturber pair 2220 to compensate for the alien crosstalk effect from the same disturber pair 2220. The compensation mechanisms 1220 can be configured to generate each signal compensator.

Figure 24:
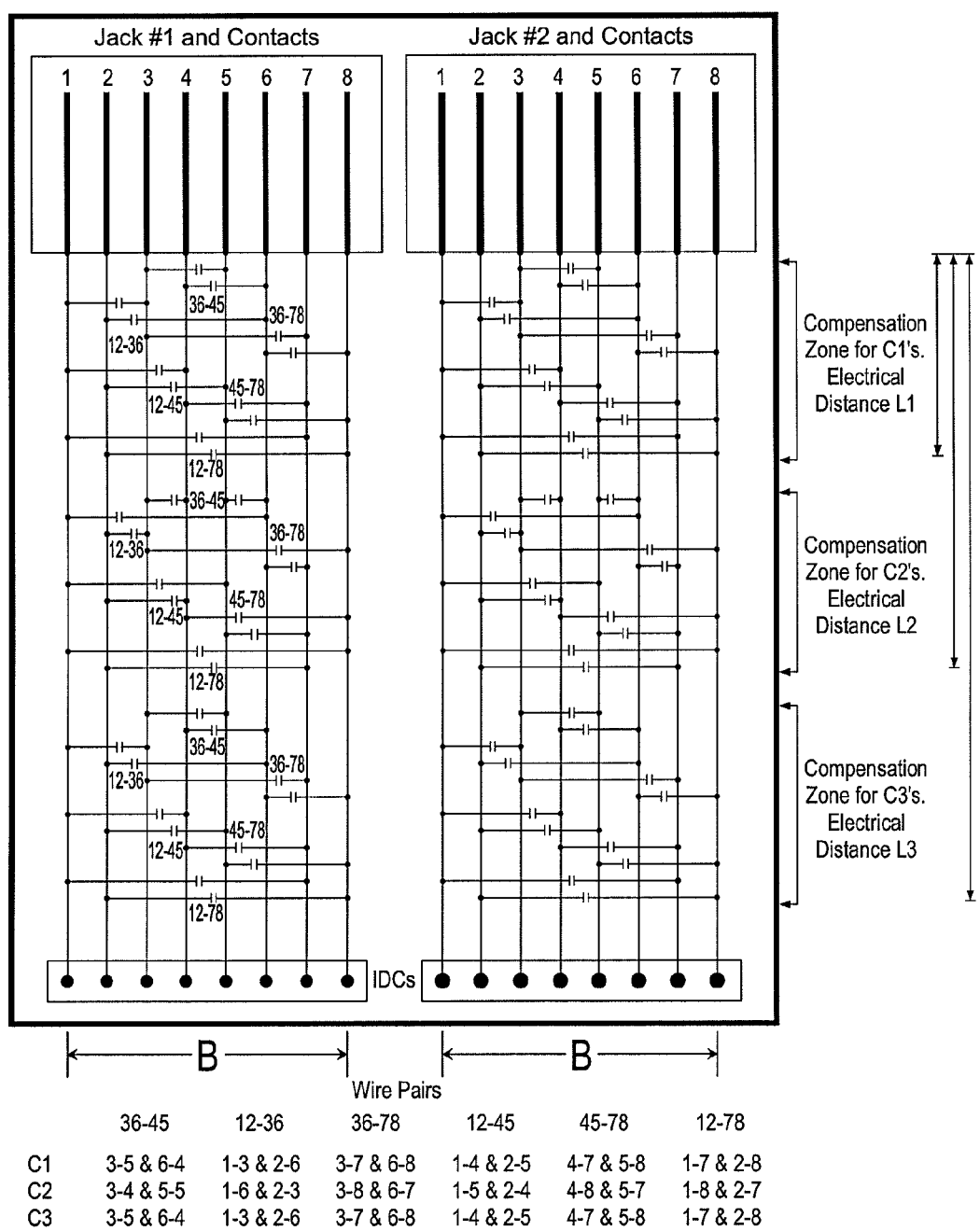
FIG. 24 illustrates an example signal compensation scheme for compensating for crosstalk internal to a jack.

Further, the jack assembly 100-6 can include a mechanism for generating another signal compensator that compensates for intra-connector crosstalk between the victim pairs 2210 of the victim jack 2110. Many such mechanisms are known. An example signal compensation scheme for compensating for intra-connector crosstalk jacks is shown in FIG. 24. The schematic illustrated in FIG. 24 shows three sample compensation zones for each of the jacks. The C1 compensation zone is placed physically close to the plug-to-jack contact point, keeping the electrical length L1 as short as possible. The C2 compensation zone is located at a region that is approximately at a distance between length L1 and L2. The C3 compensation zone is located at a region that is approximately at a distance between length L2 and L3. As noted above, compensation coupling can be capacitive or inductive. The example shown in FIG. 24 is capacitive coupling.

It should be understood that not all of the illustrated combinations need to be used for compensating for internal crosstalk. Only those conductor pairs that do not meet the transmission requirements for crosstalk should be compensated. It is also preferable to position the internal signal compensators such that the internal capacitive or inductive coupling itself does not lead to additional crosstalk within a jack or between two adjacent jacks. For example, in one embodiment, the compensation structure is kept within boundaries B defined by the jack contacts. As mentioned above, other techniques described such as appropriate shielding or space-maximizing through offsetting or staggering of the jacks can also be used in combination with the internal capacitive or inductive coupling to minimize alien crosstalk.

The signal compensation schemes illustrated in FIGS. 23 and 24 are preferably used in combination with each other. For clarity purposes, however, the two kinds of compensation schemes have been illustrated separately. Accordingly, for example, a jack assembly 100-6 can include mechanisms configured to generate a first signal compensator that compensates for intra-connector crosstalk and a second signal compensator that compensates for alien crosstalk from a number of adjacent jacks 2120. In some embodiments, the number of adjacent jacks 2120 includes each jack 2120 within approximately two inches of the victim jack 2110. Preferably, the signal compensators, both intra jack and inter-jack, should be positioned and numbered such that they do not create additional crosstalk. As noted above, where needed, both intra-jack and inter jack compensation schemes can be used with other crosstalk minimizing techniques such as shielding, offsetting, staggering, etc. to minimize the effect of the crosstalk, both alien and internal.

The compensation techniques are not limited to compensation mechanisms 1220 of the circuit board 1210. Many other compensation techniques can be used to generate the signal compensators for compensating against the effects of alien crosstalk. For example, digital signal processing may be used to produce signal compensators designed to compensate for the determined alien crosstalk effects. Arrangements of wires or conductive leads can also be used to produce the signal compensator. Inductive and/or capacitive coupling as shown in FIGS. 23 and 24 may be used to generate the signal compensator. In short, many different mechanisms can be used to generate the signal compensator to compensate for the determined alien crosstalk effects.

The determination and compensation techniques discussed above can be applied to any jack assembly, including any of the jack assemblies discussed herein. Accordingly, the compensation views can be effectively applied in combination with any of the shield views and/or positional views discussed above. By using a combination of shield views, positional views, and compensation views, alien crosstalk between adjacent connectors of a jack assembly can be further reduced.

IV. Alternative Embodiments

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in connector configurations, and that the invention will be incorporated into such future embodiments.

What is claimed is:

1. A method of compensating for crosstalk, the method comprising: applying a signal compensator between a first jack that is configured to receive a first plug and a separate second jack that is configured to receive a separate second plug to compensate for alien crosstalk generated between the first and second jacks; and applying a second signal compensator between electric conductors within at least one of the first jack and the second jack to compensate for intraconnector crosstalk generated between the electric conductors within at least one of the first jack and the second jack.

2. The method of claim 1, wherein the compensation signal is applied via a capacitive coupling between electric conductors of the first and second jacks.

3. The method of claim 2, wherein the capacitive coupling is provided by capacitors provided on a circuit board to which the first and second jacks are mounted.

4. The method of claim 1, wherein the compensation signal is applied via an inductive coupling between electric conductors of the first and second jacks.

5. The method of claim 4, wherein the inductive coupling is provided by inductors provided on a circuit board to which the first and second jacks are mounted.

6. The method of claim 1, wherein the compensation signal is applied via both an inductive and a capacitive coupling between electric conductors of the first and second jacks.

7. A telecommunications component comprising: a first jack that is configured to receive a first plug, the first jack having conductors; a second jack that is configured to receive a separate second plug, the second jack having conductors; a signal compensator between the conductors of the first and second jacks, the signal compensator having a magnitude and location selected to compensate for alien crosstalk between the first and second jacks; and a second signal compensator between the conductors within at least one of the first jack and the second jack to compensate for intraconnector crosstalk generated between the conductors within at least one of the first jack and the second jack.

8. The telecommunications component of claim 7, wherein the signal compensator is generated by a capacitive coupling between the conductors of the first and second jacks.

9. The telecommunications component of claim 8, wherein the capacitive coupling is provided by capacitors provided on a circuit board to which the first and second jacks are mounted.

10. The telecommunications component of claim 7, wherein the signal compensator is generated by an inductive coupling between the conductors of the first and second jacks.

11. The telecommunications component of claim 10, wherein the inductive coupling is provided by inductors provided on a circuit board to which the first and second jacks are mounted.

12. The telecommunications component of claim 7, wherein the signal compensator is generated by both an inductive and a capacitive coupling between the conductors of the first and second jacks.

* * * * *